US009306986B2

(12) United States Patent
Kim et al.

(10) Patent No.: US 9,306,986 B2
(45) Date of Patent: Apr. 5, 2016

(54) METHOD FOR CONTROLLING SESSION AND SERVER USING THE SAME

(75) Inventors: Laeyoung Kim, Gyeonggi-Do (KR); Taehyeon Kim, Gyeonggi-Do (KR); Hyunsook Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 491 days.

(21) Appl. No.: 12/942,647

(22) Filed: Nov. 9, 2010

(65) Prior Publication Data

US 2011/0161508 A1 Jun. 30, 2011

Related U.S. Application Data

(60) Provisional application No. 61/259,593, filed on Nov. 9, 2009, provisional application No. 61/328,192, filed on Apr. 27, 2010, provisional application No. 61/330,392, filed on May 2, 2010, provisional application No. 61/357,065, filed on Jun. 21, 2010.

(30) Foreign Application Priority Data

Oct. 19, 2010 (KR) ......................... 10-2010-0102073

(51) Int. Cl.

| G06F 15/16 | (2006.01) |
|---|---|
| H04L 29/06 | (2006.01) |
| H04W 60/00 | (2009.01) |
| H04W 36/00 | (2009.01) |
| H04W 60/04 | (2009.01) |

(52) U.S. Cl.
CPC ........ *H04L 65/4015* (2013.01); *H04L 65/1073* (2013.01); *H04L 65/1089* (2013.01); *H04L 65/1093* (2013.01); *H04W 36/00* (2013.01); *H04W 36/0022* (2013.01); *H04W 60/00* (2013.01); *H04W 60/04* (2013.01)

(58) Field of Classification Search
CPC . H04W 36/0022; H04W 60/00; H04W 60/04; H04W 36/00; H04L 65/1073; H04L 65/4015; H04L 65/1089
USPC .......................................... 709/228
See application file for complete search history.

(56) References Cited

U.S. PATENT DOCUMENTS

2009/0086742 A1* 4/2009 Ghai et al. .................... 370/401
2009/0245180 A1* 10/2009 Wu ............................... 370/328

(Continued)

FOREIGN PATENT DOCUMENTS

KR  10-2007-0120022 A   12/2007
KR  10-2008-0070348 A    7/2008

(Continued)

*Primary Examiner* — Ario Etienne
*Assistant Examiner* — Blake Rubin
(74) *Attorney, Agent, or Firm* — Morgan, Lewis & Bockius LLP

(57) ABSTRACT

Disclosed is a method for masking media flows against a discovery procedure for inter-UE transfer. According to the method, when a Service Centralization and Continuity Application Server (SCC AS) establishes a session, an User Equipment (UE) is able to indicate to the network that some or all of the media flow composing a session are not discoverable from other UEs. Therefore, when the SCC AS receives the request for discovery for discovery of the ongoing session on any UE, the SCC AS identifies which media flows in the ongoing session of the UE are indicated as indiscoverable, and does not send information about theses media flows to the other UEs.

18 Claims, 10 Drawing Sheets

(56) References Cited

U.S. PATENT DOCUMENTS

| | | | |
|---|---|---|---|
| 2009/0313378 A1* | 12/2009 | Mahdi et al. | 455/414.1 |
| 2010/0023624 A1* | 1/2010 | Long et al. | 709/227 |
| 2010/0034168 A1* | 2/2010 | Mahdi | 370/331 |
| 2010/0036958 A1* | 2/2010 | Mahdi | 709/227 |
| 2010/0064172 A1* | 3/2010 | George et al. | 714/15 |
| 2010/0103927 A1* | 4/2010 | Bakker | 370/352 |
| 2010/0124897 A1* | 5/2010 | Edge | 455/404.1 |
| 2010/0169495 A1* | 7/2010 | Zhang et al. | 709/227 |
| 2010/0172347 A1* | 7/2010 | Zisimopoulos | 370/352 |
| 2010/0260105 A1* | 10/2010 | Keller et al. | 370/328 |
| 2010/0312834 A1* | 12/2010 | Doken et al. | 709/205 |
| 2010/0312841 A1* | 12/2010 | Doken et al. | 709/206 |
| 2011/0053571 A1* | 3/2011 | Mahdi et al. | 455/414.1 |
| 2011/0110275 A1* | 5/2011 | Shaheen | 370/260 |
| 2011/0116473 A1* | 5/2011 | Shaheen et al. | 370/331 |
| 2011/0153866 A1* | 6/2011 | Keller et al. | 709/244 |
| 2011/0173292 A1* | 7/2011 | Patel et al. | 709/217 |
| 2011/0196973 A1* | 8/2011 | Shaheen et al. | 709/228 |
| 2011/0231560 A1* | 9/2011 | Mahendran et al. | 709/228 |
| 2011/0238845 A1* | 9/2011 | Keller et al. | 709/227 |
| 2011/0270995 A1* | 11/2011 | Mutikainen et al. | 709/227 |
| 2011/0289148 A1* | 11/2011 | Kowalewski | 709/205 |
| 2012/0014356 A1* | 1/2012 | Mutikainen et al. | 370/331 |
| 2012/0044868 A1* | 2/2012 | Faccin et al. | 370/328 |
| 2012/0127926 A1* | 5/2012 | Drevon et al. | 370/328 |
| 2012/0137008 A1* | 5/2012 | Atarius | 709/227 |
| 2012/0311026 A1* | 12/2012 | Yi et al. | 709/203 |
| 2013/0143565 A1* | 6/2013 | Zisimopoulos et al. | 455/436 |
| 2013/0322312 A1* | 12/2013 | Kim et al. | 370/310 |

FOREIGN PATENT DOCUMENTS

| | | |
|---|---|---|
| KR | 10-2009-0009914 A | 1/2009 |
| KR | 10-2009-0039723 A | 4/2009 |

* cited by examiner

METHOD FOR CONTROLLING SESSION AND SERVER USING THE SAME

CROSS-REFERENCE TO RELATED APPLICATION

Pursuant to 35 U.S.C. §119(a), this application claims the benefit of U.S. Provisional Applications No. 61/259,593, filed on Nov. 9, 2009, No. 61/328,192, filed on Apr. 27, 2010, No. 61/330,392, filed on May 2, 2010 and No. 61/357,065, filed on Jun. 21, 2010, and the benefit of earlier filing date and right of priority to Korean Application No. 10-2010-0102073, filed on Oct. 19, 2010, the content of which is incorporated by reference herein in its entirety.

BACKGROUND OF THE INVENTION

1. Field of the Invention

This disclosure relates to an Inter-UE Transfer (IUT).

2. Background of the Invention

In general, a session between a first terminal and a service provider, or between the first terminal and a second terminal in a network based upon an Internet Protocol (IP) Multimedia Subsystem (MS) (IMS) is performed under control of an application server.

Recently, as users use various types of plural terminals (for example, portable terminals, TVs, computers, smart phones, etc.), a research has been devoted to the technique for transferring/copying part or all of media flows composing a session, which was established by a first terminal, to a second terminal.

The transfer, move or copy of part or all of media flows in a session between terminals is referred to as Inter-UE Transfer (IUT).

The IUT may also be performed between terminals belonging to different users, as well as being performed between terminals belonging to same user, which has recently been researched in 3GPP Release 10. Consequently, information share, collaboration and entertainment between family members, business members and social network members are allowed by virtue of the IUT. The IUT will be described with reference to FIG. 1.

FIG. 1 is an overview showing an Inter-UE Transfer (IUT) according to the related art.

As shown in the left side of FIG. 1(a), a first user possesses a plurality of terminals, e.g., User Equipment (UE)-1, UE-2 and UE-3. The UE-1 owned by the first user has a session containing audio and video media with a remote end, for example, a service provider. FIG. 1 shows a Service Centralization and Continuity Application Server (SCC AS), which controls such session.

Under the environments, the first user desires to use the UE-2 and UE-3, respectively to perform the session with the remote end. For example, if it is assumed that the UE-1 is a cellular phone, the UE-2 is an earset or headset having a communication function, and the UE-3 is a Head Up Display (HUD) having a communication function, the first user desires to perform the audio media session with the remote end via the earset or headset, and perform the video media session with the remote end via the HUD.

Accordingly, as shown in the right side of FIG. 1(a), the audio media flow which was terminated to the UE-1, is transferred to the UE-2 and the video media flow thereof is transferred to the UE-3. Here, even after the audio and video media flows are transferred from the UE-1 to the UE-2 and UE-3, respectively, the UE-1 can still control the transferred audio and video media flows.

Here, the UE-1 is called as a controller UE and the UE-2 and the UE-3 are called as controllee UEs. Also, the session, which contains the audio and video media and in which the UE-1, UE-2 and UE-3 take part, is referred to as a collaborative session.

Meanwhile, as shown in the left side of FIG. 1(b), the first user is performing a session containing audio media flow using the UE-2 and is performing a session containing video media flow using the UE-3, and these media flows are under control of the UE-1. Here, the first user transfers the control (control-ownership) taken by the UE-1 to the UE-2.

Accordingly, as shown in the right side of FIG. 1(b), the UE-2 is performing the session containing the audio media flow, and has the control for the collaborative session in which the UE-2 and UE-3 are involved. The UE-3 keeps performing the session containing the video media flow. After the transfer of the control, UE-2 becomes a controller UE, and UE-3 is a controllee UE as the same as before, UE-1 no more belongs to the collaborative session.

On the other hand, as shown in the left side of FIG. 1(c), the first user is performing a session containing audio and video media flows with the remote end via the UE-1. Here, the first user transfers both the audio and video media flows and the control to the UE-3.

As shown in the right side of FIG. 1(c), the UE-3 accordingly performs the session containing the audio and video media flows. In this inter-UE transfer, no collaborative session is established.

FIG. 2 shows an IUT process according to the related art.

It is assumed in FIG. 2 that UE-1 11 and UE-2 12 belong to a user A, and UE-3 13 belongs to a user B.

FIG. 2 also shows a home network in which the users have subscribed. The home network includes IP Multimedia Subsystem (IMS) nodes 51, SCC AS-1 52a and SCC AS-2 52b.

As shown in FIG. 2, in a state where the user A is performing a session containing text, audio and video media with the remote end 30 via the UE-1 11, the user A transfers the audio and video media flows to the UE-3 13 belonging to the user B while maintaining the session continuity. Here, even after the audio and video media flows are transferred to the UE-3 13, the UE-1 11 still has the control for the transferred media flows, which will be described in detail with reference to FIG. 2.

1) The UE-1 11 decides to transfer the audio and video media flows to the UE-3 13.

2a~2b) The UE-1 11 sends a transfer request message, for example, Media Transfer Request message, to the SCC AS-1 52a to transfer the audio and video media flows to the UE-3 13.

3) The SCC AS-1 52a then authorizes or verifies the transfer request message sent by the UE-1 11. The authorization and verification may be performed based upon subscriber information. The authorization and verification may be performed to determine whether the UE-1 11 is a terminal for which the IUT operation is supported (allowed). Alternatively, the authorization or verification may be performed to determine whether the media flows in the UE-1 11 can be transferred to the UE-3 13.

4) The SCC AS-1 52a transfers the transfer request message to the SCC AS-2 52b via the IMS nodes 51.

5) The SCC AS-2 52b authorizes or verifies the transfer request message. The authorization or verification may be performed based upon subscriber information, which is similar to the foregoing description, so it will be understood by the foregoing description without detailed description.

6a~6b) The SCC AS-2 52b sends a session initiation request message (for example, SIP-based INVITE message), which includes information related to the audio and video media flows requested to be transferred, to the UE-3 13 via the IMS nodes, in response to the transfer request message.

7a~7b) The UE-3 13 then sends a session initiation accept message to the SCC AS-2 52b via the IMS nodes 51, in response to the session initiation request message.

8) The SCC AS-2 52b then forwards the session initiation accept message to the SCC AS-1 52a via the IMS nodes 51.

9) The SCC AS-1 52a completes the transfer of the audio and video media flows from the UE-1 11 to the UE-3 13 based upon the session initiation accept message.

The UE-1 11 has the control for a collaborative session containing the text media, the audio media and the video media, after transferring the audio and video media flows to the UE-3 13. That is, the UE-1 11 then serves as a controller UE, and the UE-3 13 serves as a controllee UE.

FIG. 3 is an exemplary view showing problems of the related art.

As shown in FIG. 3, UE-1 11 and UE-2 12 belong to a user A, and UE-3 13 belongs to a user B.

Also, FIG. 3 shows a home network in which the users A and B have subscribed. The home network includes IMS nodes 51, SCC AS-1 52a and SCC AS-2 52b.

1~2) The UE-1 11 sends a registration request to the IMS nodes 51 to register in its home network, and receives an acknowledgement message. Here, the registration informs the home network of the UE-1 11's current location.

3~4) The IMS nodes 51 then perform a third-party registration for the UE-1 to SCC AS-1 52a, which serves the UE-1 11, and receives an acknowledgement message therefrom.

5a~5d) When the UE-1 11 sends a session initiation request message to establish a session containing audio and video media with a remote end 30, the IMS nodes 51 then forward the session initiation request message to the SCC AS-1 52a serving the UE-1 11 based upon subscriber information of the user A. The SCC AS-1 52a then transfers the session initiation request message to the remote end 30 via the IMS nodes 51.

6a~6d) The remote end 30 sends a session initiation accept message to the IMS nodes 51, and the IMS nodes 51 forward it to the SCC AS-1 52a. The SCC As-1 52a then transfers the session initiation accept message to the UE-1 11 via the IMS nodes 51. Accordingly, the session containing the audio and video media is established between the UE-1 11 and the remote end 30.

7~8) Meanwhile, the user A desires to transfer some media of the session or control for the session from the UE-1 11 to the UE-2 12, and thus manipulates the UE-2 12. However, the UE-2 12 has no information related to the session being performed by the UE-1 11 (for example, the UE-2 12 cannot know which media flows are ongoing on the UE-1), and thus it may not decide which media flows can be taken from the UE-1 11. Hence, the UE-2 12 cannot generate and send a transfer request message.

9~10) Also, the user B desires to transfer some media of the session or the control for the session from the UE-1 11 to the UE-3 13, and thus manipulates the UE-3 13. However, the UE-3 13 has no information related to the session being performed by the UE-1 11 (for example, the UE-3 13 cannot know which media flows are ongoing on the UE-1), and thus it may not decide which media flows can be taken from the UE-1 11. Hence, the UE-3 13 cannot generate and send a transfer request message.

SUMMARY OF THE INVENTION

Consequently, according to the related art, other terminals, for example, UE-2 and UE-3, which do not have the control for the session being performed by a specific terminal (e.g., UE-1 in FIG. 3), cannot acquire information related to the session, so they cannot request a transfer of part or all of media flows in the session and/or the control of the session therefore. One example of such problems will be described as follows. If it is assumed that the UE-1 11 is a device such as PC and the UE-2 12 is a cellular phone, the user having UE-1 11 and UE-2 12 may be more convenient to manipulate the UE-2 12 to transfer part or all of media flows in the session being performed by the UE-1 11 and/or the control for the session. However, the related art does not provide any mechanism that the UE-2 12 can acquire the information related to the session being performed by the UE-1 11 and accordingly the UE-2 12 cannot send a transfer request message.

Therefore, an aspect of the detailed description is to address those problems.

In other words, an aspect of the detailed description is for other terminals to request and acquire information related to a session(s), which is being performed by a specific terminal, for example, specific media flows in the session, information related to whether or not the session is a collaborative session and the like.

Another aspect of the detailed description is that the specific terminal is allowed not to provide information related to the ongoing session(s) to other terminals, for reasons of, for example, privacy and the like.

To achieve these and other advantages and in accordance with the purpose of the detailed description, there is provided a method for controlling a session in a server for controlling the session being performed between at least one first terminal and a remote end. The method includes receiving a session discovery request message for acquiring information related to the session being performed between the at least one first terminal and a remote end from a second terminal; checking whether or not the second terminal is permitted (allowed) to acquire the information related to the session being performed by the first terminal; if permitted, checking which kind of media flows are contained in the session on the first terminal; checking whether or not there exists a media flow(s) to be masked or filtered among all the checked media flows, based upon information related to the masking from IUT discovery (session discovery) configured for the first terminal; if there exists the media flow(s) to be masked or filtered among all the checked media flows, transmitting a session discovery response message including information related to the rest of one or more media flows except for the masked or filtered media flow(s) to the second terminal; receiving a transfer request message for a specific media flow(s) among the rest of one or more media flows from the second terminal; checking whether or not the session containing the media flow(s) requested to be transferred is a collaborative session, in response to the transfer request message received; forwarding the transfer request message to a controller terminal having the collaborative session control if the session is a collaborative session; and forwarding the transfer request message to the first terminal if the session is not a collaborative session.

The information related to the masking with respect to IUT discovery (session discovery) for the first terminal may be included in a registration request message from the first terminal.

The information related to the masking with respect to IUT discovery (session discovery) for the first terminal may be included in a session initiation request message from the first terminal.

The information related to the masking with respect to IUT discovery (session discovery) for the first terminal may be included in a session initiation accept message from the first terminal.

The information related to the masking with respect to IUT discovery (session discovery) for the first terminal may be acquired from a subscriber information (database) server within a network.

The information related to the masking with respect to IUT discovery (session discovery) may include information indicating that all media types in the session being performed by every terminal belonging to a specific user should be masked or filtered, information indicating only a specific media type(s) in the session being performed by each of all terminals belonging to a specific user should be masked or filtered, information indicating all media types in the session being performed by a specific terminal belonging to a specific user should be masked or filtered, or information indicating that only a specific media type(s) in the session being performed by a specific terminal belonging to a specific user should be masked or filtered.

The information related to the masking with respect to IUT discovery (session discovery) may also include a parameter(s) indicating whether specific information included in a session discovery response message should be masked or filtered.

Accordingly, the transfer process can be efficiently performed by allowing another terminal to freely acquire information related to a session being performed by a specific terminal, or masking the another terminal from acquiring such information when it may cause a problem, such as privacy-related problem or the like.

Also, the use of the session-related information can allow efficient performing of processes without failure of IUT operation.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
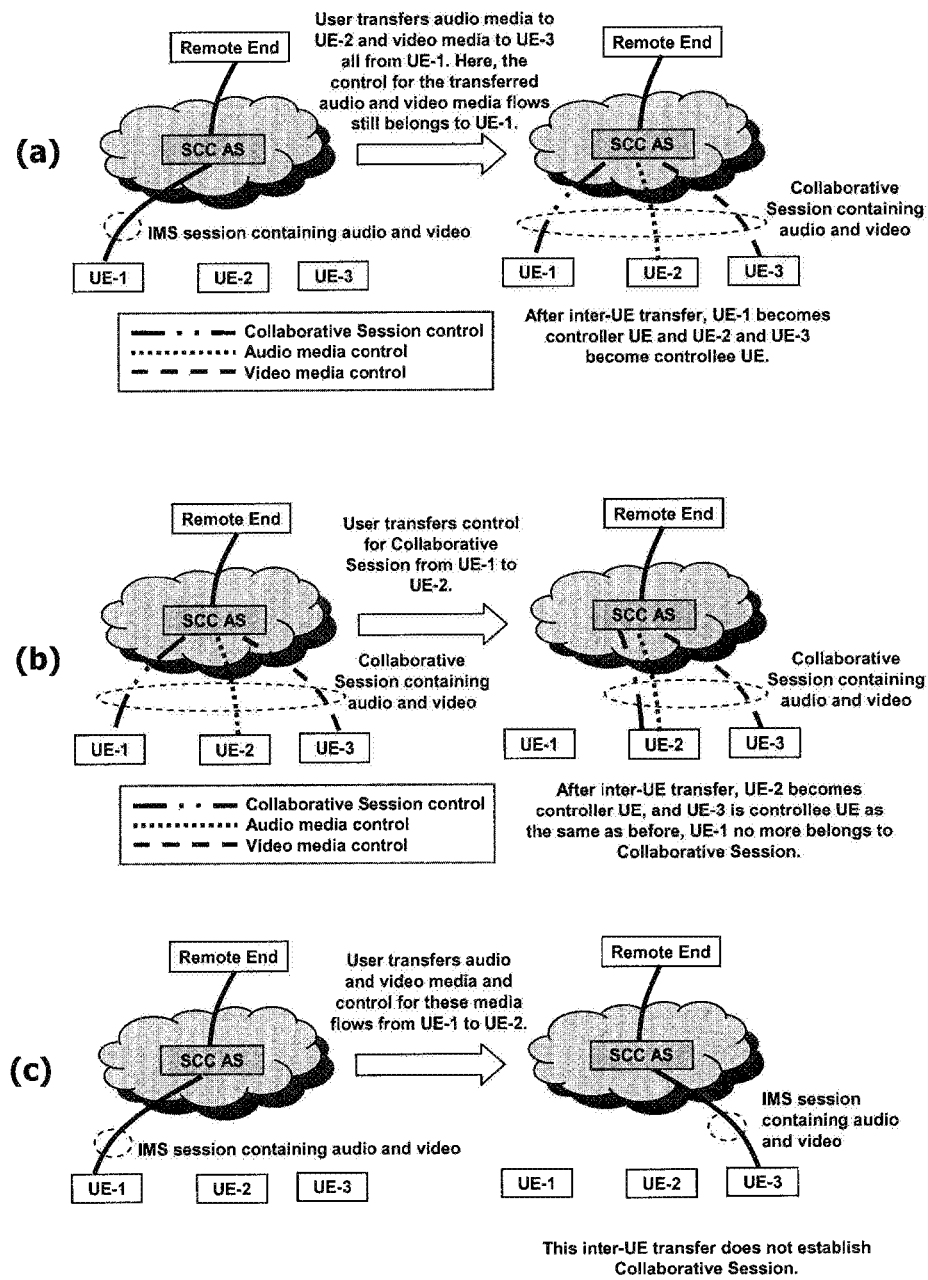
FIG. 1 is an overview showing an Inter-UE Transfer (IUT) according to the related art.
Figure 2:
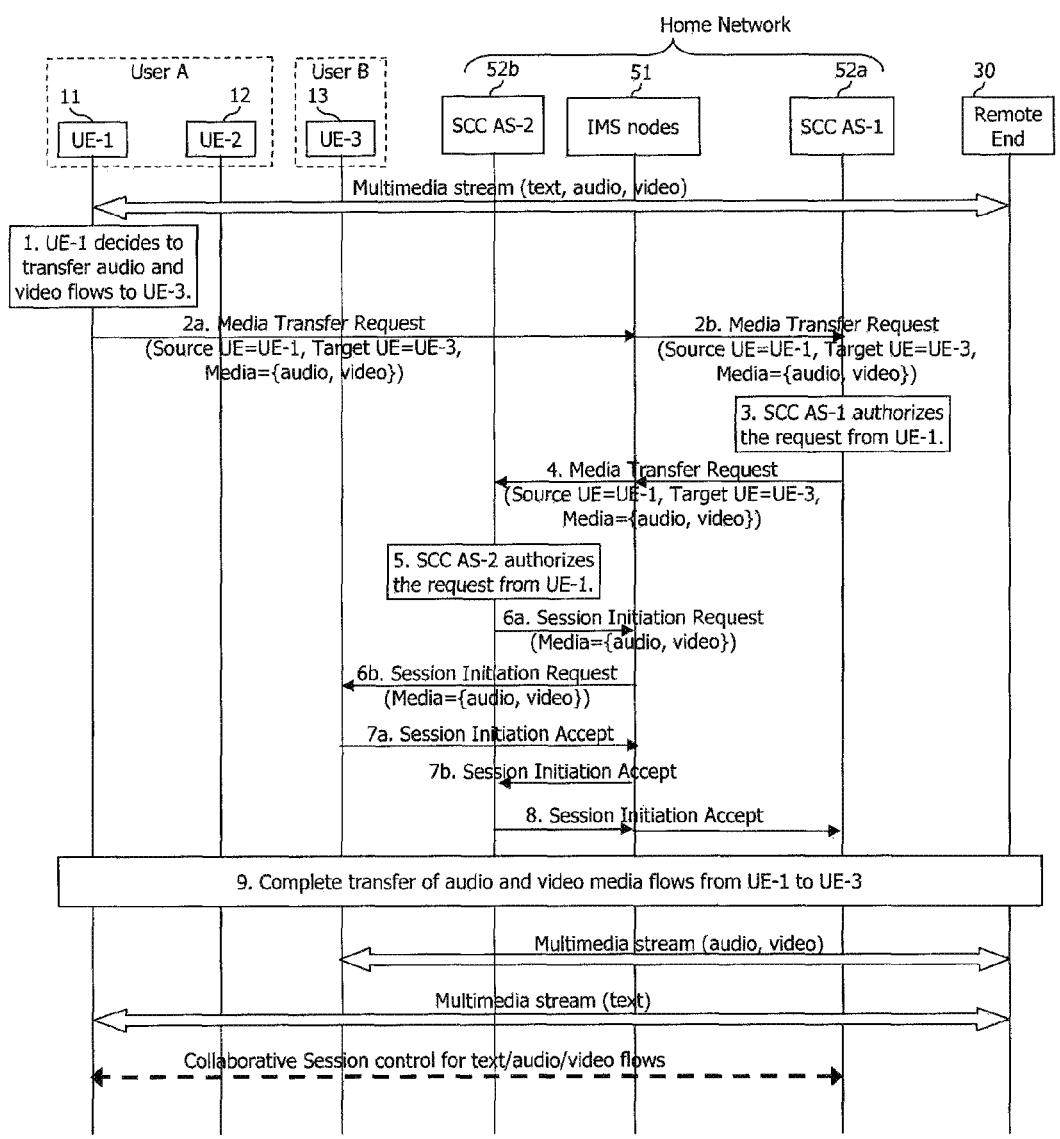
FIG. 2 is a view showing an IUT process according to the related art.
Figure 3:
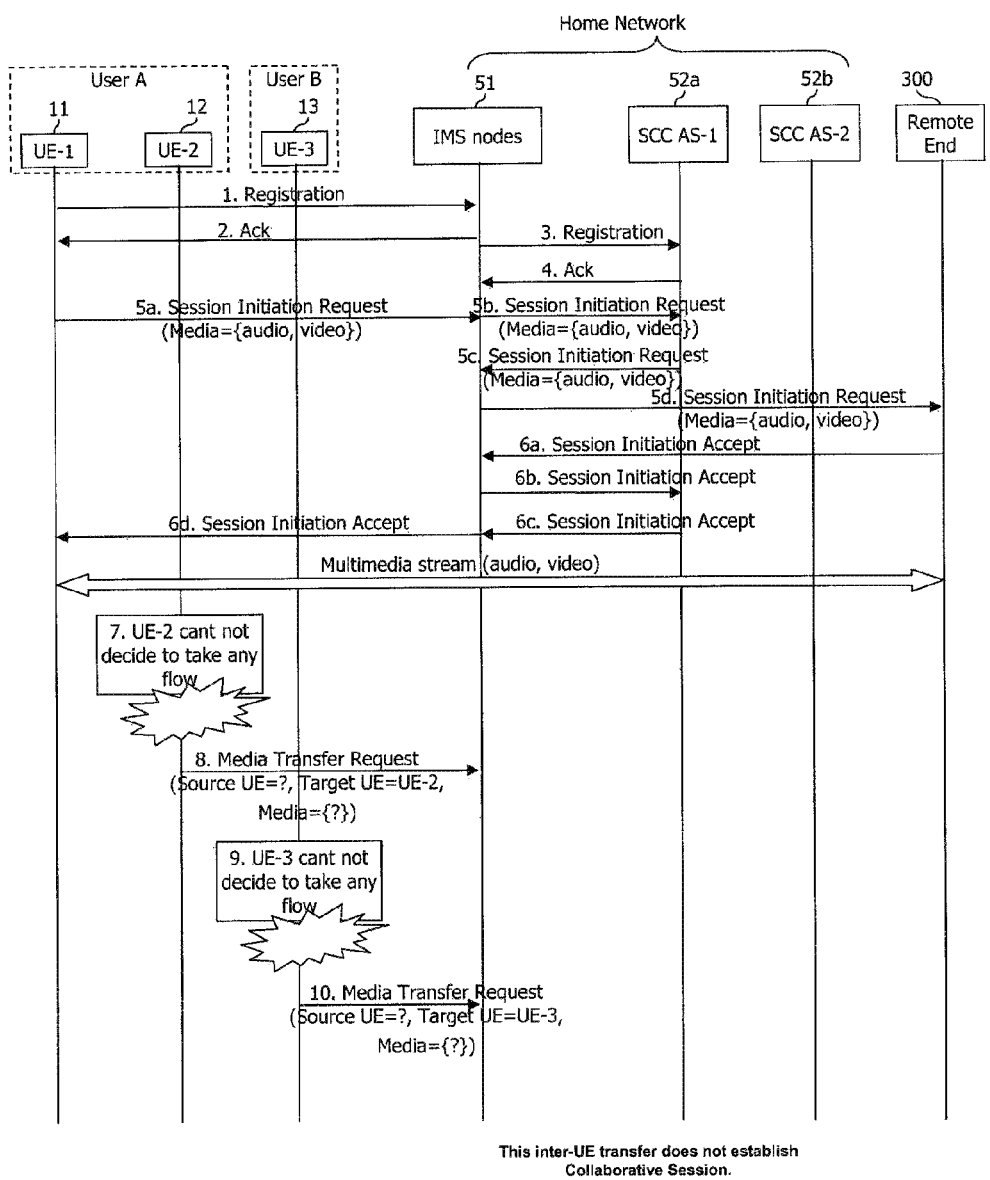
FIG. 3 is an exemplary view showing problems of the related art.

Technical terms used in this specification are used to merely illustrate specific embodiments, and should be understood that they are not intended to limit the present disclosure. As far as not being defined differently, all terms used herein including technical or scientific terms may have the same meaning as those generally understood by an ordinary person skilled in the art to which the present disclosure belongs to, and should not be construed in an excessively comprehensive meaning or an excessively restricted meaning. In addition, if a technical term used in the description of the present disclosure is an erroneous term that fails to clearly express the idea of the present disclosure, it should be replaced by a technical term that can be properly understood by the skilled person in the art. In addition, general terms used in the description of the present disclosure should be construed according to definitions in dictionaries or according to its front or rear context, and should not be construed to have an excessively restrained meaning.

A singular representation may include a plural representation as far as it represents a definitely different meaning from the context. Terms 'include' or 'has' used herein should be understood that they are intended to indicate an existence of several components or several steps, disclosed in the specification, and it may also be understood that part of the components or steps may not be included or additional components or steps may further be included.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

It will be understood that when an element is referred to as being "connected with" another element, the element can be directly connected with the other element or intervening elements may also be present. In contrast, when an element is referred to as being "directly connected with" another element, there are no intervening elements present.

Embodiments of the present invention will be described below in detail with reference to the accompanying drawings, where those components are rendered the same reference number that are the same or are in correspondence, regardless of the figure number, and redundant explanations are omitted. In describing the present invention, if a detailed explanation for a related known function or construction is considered to unnecessarily divert the gist of the present invention, such explanation has been omitted but would be understood by those skilled in the art. The accompanying drawings are used to help easily understood the technical idea of the present invention and it should be understood that the idea of the present invention is not limited by the accompanying drawings. The idea of the present invention should be construed to extend to any alterations, equivalents and substitutes besides the accompanying drawings.

The accompanying drawings exemplarily show User Equipment (UE), but the UE may be replaced with other terms, such as terminal, Mobile Equipment (ME) and the like. Also, the UE may be a type of portable equipment, such as a notebook, a cellular phone, PDA, a smart phone, a multimedia player and the like, or a type of fixed equipment, such as PC, vehicle-mounted device and the like.

TERM DEFINITION

Hereinafter, prior to description of main characteristics of the present disclosure, brief description will be given of definitions of terms used in this specification, for better understanding.

1) IP Multimedia Subsystem (IMS) is a network technology which allows packet switching for wireless terminals as well as wired terminals based upon Internet Protocol (IP), and has been proposed for connection of both wired and wireless terminals via IP (AII-IP).

A network based upon the IMS includes a Home Subscriber Server (HSS) having a database for storing subscriber information on users (i.e., subscribers), and other entities. Also, the IMS-based network includes a Call Session Control Function (CSCF) for processing control signaling, registration, and procedures for sessions. The CSCF may include Proxy-CSCF (P-CSCF), Serving-CSCF (S-CSCF) and Interrogating-CSCF (I-CSCF). The P-CSCF serves as a first access point for a user Equipment (UE) within the IMS-based network, and the S-CSCF processes and controls a session within the IMS network. That is, the S-CSCF is an entity for routing of a signaling, which routes a session in the IMS network. The I-CSCF serves as an access point to other entities within the IMS network.

2) An IP-based session under the IMS is controlled by a Session Initiation Protocol (SIP). The SIP is a protocol for control of a session, namely, a signaling protocol, which specifies procedures that terminals, which desire to communicate with each other, identify each other to find locations, generate a multimedia session therebetween, or delete or modify the generated session. The SIP may use a SIP Uniform Resource Identifier (URI), similar to an e-mail address, for discrimination of each user, so as to provide services irrespective of the IP addresses.

3) Registration indicates a process that UE notifies information related to its current location to the home network, namely, a process that the UE sends its current location and other information to access the home network.

4) Application Server (AS) is a server for providing various multimedia services.

5) Multimedia Session Continuity indicates supporting UE mobility or mobility between UEs while maintaining the continuity of an ongoing session.

6) Service Centralization and Continuity Application Server (SCC AS) is an application server which supports a multimedia session continuity. [Refer to 3GPP TS 23.237 V10.3.0]

7) Collaborative Session is a set of two or more access legs and related media on two or more UEs having IMS subscriptions under the same operator that are presented as one remote leg by the SCC AS. [Refer to 3GPP TS 23.237 V10.3.0]

8) Controller UE is a UE that controls a Collaborative Session and whose service profile determines the services on the remote leg. The Controller UE may also support media flows for a Collaborative Session and may request IUT Media Control Related Procedures. [Refer to 3GPP TS 23.237 V10.3.0]

9) Controllee UE is a UE that supports media flows for a Collaborative Session and may request IUT Media Control Related Procedures but is subordinate to the Controller UE for authorization of these procedures. A plurality of Controllee UEs may be involved in a Collaborative Session. [Refer to 3GPP TS 23.237 V10.3.0]

10) Remote End is a counter UE or a counter application server communicating with the UE.

11) Inter-UE Transfer (IUT) indicates transfer at the IMS-level of some or all of the media flows and/or service control across a set of having IMS subscriptions under the same operator.

12) IUT Media Control Related Procedures indicate the control operations on the media flows of the Collaborative Session which involve multiple UEs or need Controller UE's authorization within the Collaborative Session, e.g. ability to transfer/add/replicate media flows, to remove/modify media flows on a different UE. [Refer to 3GPP TS 23.237 V10.3.0]

13) Collaborative Session Control is the control operation on the Collaborative Session which can only be performed by the Controller UE, e.g. ability to release the Collaborative Session, to invoke supplementary services, and to authorize requests for IUT Media Control Related Procedures from other UEs. [Refer to 3GPP TS 23.237 V10.3.0]

Those terms used in this specification have been defined.

Hereinafter, detailed description will be given with reference to the accompanying drawings. However, the description will be mainly given of methods proposed in this specification, and other comments will not be described but should be construed as being included in this specification without being excluded therefrom.

Figure 4:
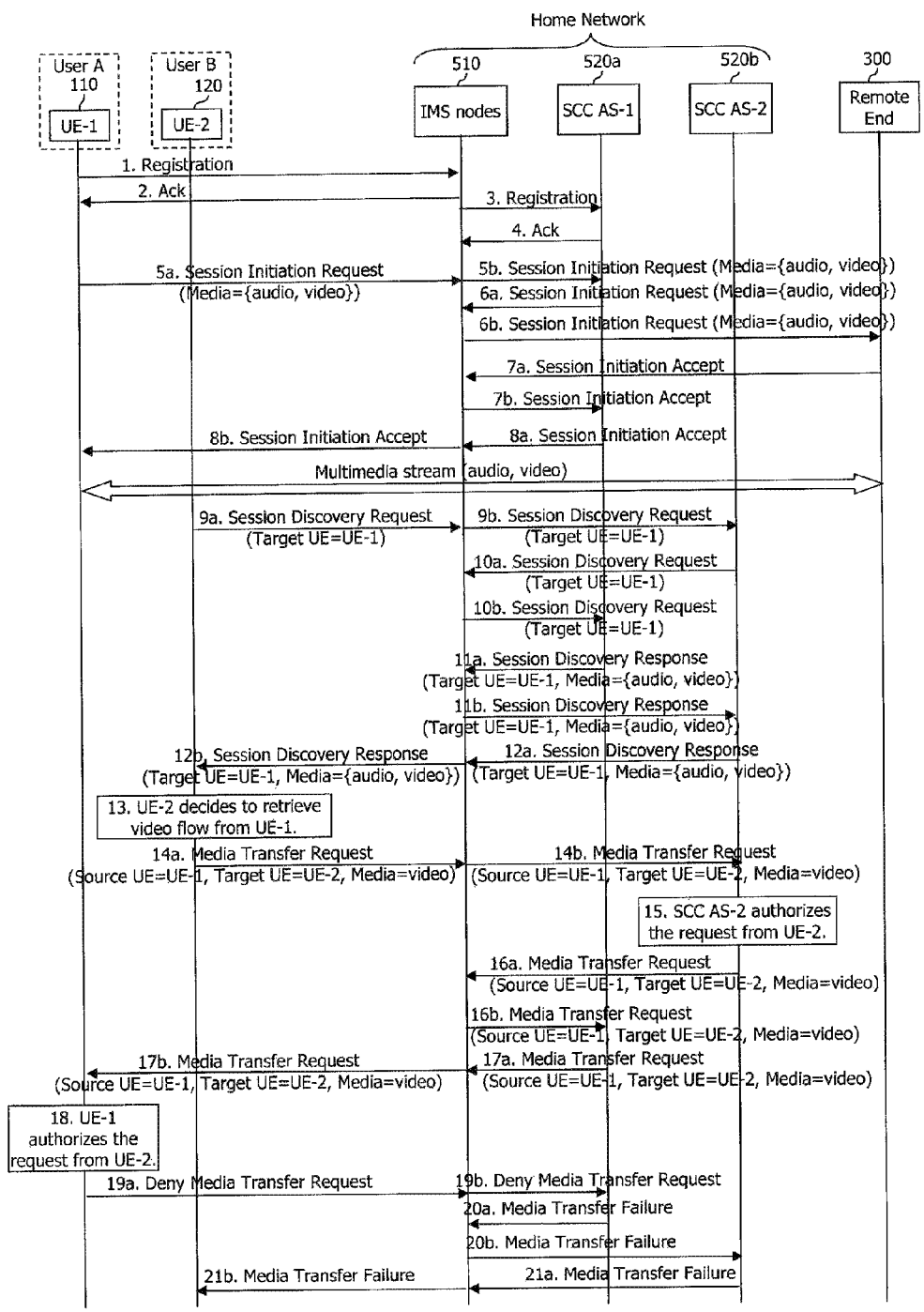
FIG. 4 is an exemplary view showing a process of acquiring information on a session being performed by a specific terminal.

FIG. 4 is an exemplary view showing a process of acquiring information on a session being performed by a specific terminal.

As shown in FIG. 4, a user A possesses User Equipment (UE)-1 110 and a user B possesses a UE-2 120. However, this is merely illustrative, and the following description will be similarly understood even if it is assumed that the user A has both UE-1 and UE-2. The term, 'user' used in this specification may be replaced with other terms, such as subscriber, IMS subscription and the like FIG. 4 also shows a home network in which the users A and B have subscribed. The home network may include IP Multimedia Subsystem (IMS) nodes 510 including S-CSCF, an SCC AS-1 520a serving the UE-1 110, and an SCC AS-2 520b serving the UE-2 120. For the IMS nodes 510 including the S-CSCF, although not shown in detail in FIG. 4, the same S-CSCF may serve both the UE-1 110 and the UE-2 120, or different S-CSCFs may serve the UE-1 110 and the UE-2 (for example, S-CSCF-1 may serve the UE-1 belonging to the user A and S-CSCF-2 may serve the UE-2 belonging to the user B).

Referring to FIG. 4, the UE-1 110 of the user A performs a registration process to the home network and establishes a session containing audio and video media with the remote end 300. Here, the UE-2 120 of the user B discovers the session, which is being performed by the UE-1 110 and then desires to request for transferring the video media in the ongoing session on the UE-1 110 to itself. Hereinafter, a detailed description thereof will be given with reference to FIG. 4. Also, it is assumed in FIG. 4 that the UE-2 120 has already registered in its home network.

1~2) The UE-1 110 sends a registration request message, for example, SIP-based REGISTER message, to register in its home network, and receives an acknowledgement message, for example, a SIP-based 200 OK message. Here, the registration informs the home network of UE-1's current location.

3~4) The IMS nodes 510 perform a third-party registration for the UE-1 110 to the SCC AS-1 520a based upon subscriber information related to the user A, and receives an acknowledgement message.

5a~5b) The user A then desires to establish a session containing audio and video media with the remote end 300 via the UE-1 110. Accordingly, the UE-1 110 sends a session initiation request message (e.g., SIP-based INVITE message) to the IMS nodes 510. The IMS nodes 510 then forward the session initiation request message to the SCC AS-1 520a based upon subscriber information related to the user A. The session initiation request message includes information related to the audio and video media.

6a~6b) The SCC AS-1 520a forwards the session initiation request message to the remote end 300 via the IMS nodes 510.

7a~8b) The remote end 300 sends a session initiation accept message (e.g., SIP-based 200 OK) to the SCC AS-1 520a via the IMS nodes 510, in response to the session initiation request message. The SCC AS-1 520a then forwards the message to the UE-1 110 via the IMS nodes 510. Consequently, a session containing audio and video media flows is established between the UE-1 110 and the remote end 300.

9a~9b) In order to perform an IUT operation using the UE-2 120, the UE-2 120 of the user B sends a session discovery request message (e.g., SIP-based SUBSCRIBE message) to the SCC AS-2 520b serving the user B so as to discover the ongoing session on the UE-1 110. The session discovery request message includes a parameter(s) indicating information related to the UE-1 110. For example, the parameter may be a target UE.

10a~10b) Upon receipt of the session discovery request message, the SCC AS-2 520b forwards the session discovery request message to the SCC AS-1 520a, which serves the UE-1 110.

11a~11b) Upon receipt of the session discovery request message, the SCC AS-1 520a sends a session discovery response message (e.g., SIP-based NOTIFY message) to the SCC AS-2 520b via the IMS nodes 510. The session discovery response message includes information related to media flows, e.g., audio and video media flows in the session which is being performed by the UE-1 110.

12a~12b) The SCC AS-2 520b forwards the session discovery response message sent by the SCC AS-1 520a to the UE-2 120 via the IMS nodes 510.

13) The UE-2 120 checks the information included in the session discovery response message, and decides to take video media flow from the UE-1 110 based upon the discovery result.

14a~14b) The UE-2 120 sends a transfer request message, e.g., Media Transfer Request message (e.g., SIP-based REFER message), to the SCC-AS-2 520b to take the video media flow from the UE-1 110. The transfer request message includes a parameter indicating information related to the UE-1 110, e.g., Source UE parameter, and a parameter indicating information related to the UE-2 120, e.g., Target UE parameter. The transfer request message also includes a media parameter indicating information related to media to be transferred.

15) The SCC AS-2 520b authorizes or verifies the transfer request message. The authorization or verification may be performed based upon subscriber information. The authorization or verification may be performed to check whether the UE-2 120 is allowed for the IUT operation or is capable of the IUT operation. Also, the authorization or verification may be performed to check whether the media flows in the session which is being performed by the UE-1 110 can be transferred to the UE-2 120. If the subscriber information does not include information related to the authorization or verification for the IUT operation, the authorization or verification may not be performed. Also, it may not be performed when the SCC AS-2 520b does not need the authorization or verification.

16a~16b) The SCC AS-2 520b forwards the transfer request message to the SCC AS-1 520a via the IMS nodes 510.

17a~17b) the SCC AS-1 520a then forwards the transfer request message to the UE-1 110 via the IMS nodes 510.

18) The UE-1 110 then authorizes or verifies the transfer request message sent by the UE-2 120. The authorization or verification may be performed through interaction with the user, or performed based upon information pre-configured in the UE-1 110 without interaction with the user.

19a~19b) The UE-1 110 sends a deny message indicating that the transfer request message forwarded by the SCC AS-1 520a is not accepted if the transfer is impossible or the UE-1 110 does not want to transfer video media flow to another terminal due to a current condition of the terminal or a network to which the terminal is connected.

20a~20b) The SCC AS-1 520a sends a message indicating failure of the transfer request to the SCC AS-2 520b via the IMS nodes 510.

21a~21b) The SCC AS-2 520b forwards the message indicating the failure of the transfer request to the UE-2 120 via the IMS nodes 510.

As described above, the information related to the session being performed by the specific terminal, e.g., the UE-1 110, can be freely acquired by another terminal, e.g., the UE-2 120. However, if the specific terminal does not want to transfer part or all of the media flows in its ongoing session, to provide information related to such media flows to the another terminal may be unnecessary.

Also, if the another terminal sends the transfer request message even when the specific terminal does not want to transfer part or all of the media flows in its ongoing session, it may result in a waste of network resources. Especially, there may be a case that the specific terminal, e.g., the UE-1 110, does not want to provide the information related to its ongoing session to other terminals in terms of privacy. Conceiving the foregoing description, the UE-2 120 may freely acquire the information related to the ongoing session on UE-1 110, which may be a problem.

In particular, a random terminal may perform a discovery request for several terminals, collect information on ongoing sessions and use such information.

As another example, it is assumed that while performing a session containing audio and video media using its own terminal, the user A has temporarily transferred audio media in the ongoing session which is a Collaborative Session and the control for the Collaborative Session to a terminal of a user B. In this state, a user C may discover information related to the session which is being performed by the terminal of the user B and know the existence of the audio media in the session. Accordingly the user C may request to transfer the audio media from the terminal of the user B to its own terminal. However, the initiation of the session is done by the user A, and the user A may not want the audio media to be transferred to another user other than the user B.

As such, due to the unrestricted discovery of the session, a controllee terminal may discover an ongoing session and send a transfer request message for media flows which are terminated to the other controllee terminal in the discovered session to a controller terminal, which may result in allowing the controllee terminal to take the ongoing media flows from the other controllee terminal.

Therefore, a method for preventing (avoiding) discovery of session-related information, namely, a method for masking or filtering session-related information will be described hereinafter.

In order to mask or filter information related to specific media flow(s) in a session, which is being performed by the specific terminal (i.e., on the specific terminal), from being discovered by other terminals, several solutions are proposed in this specification as follows.

1) First method in which a terminal sets (adds, configures, places) a masking flag(s) with respect to IUT discovery (i.e., mask from IUT discovery) in a registration message (e.g., SIP-based REGISTER message) when a terminal registers (or re-registers) in a home network A specific terminal may set, in a registration message, a masking flag(s) with respect to IUT discovery for all media types in every session (or all sessions) to be established for the terminal. In this case, masking is applied to all media flows composing every (originating and terminating) session (or all sessions), which is established by the specific terminal for the term of validity of the registration. Accordingly, when another terminal sends a session discovery request message for information related to the session which is being performed by the specific terminal, SCC AS serving the specific terminal does not provide the another terminal with information related to the masked media flows (i.e., all of the media flows) in the session on the specific terminal.

Alternatively, a specific terminal may set a masking flag(s) with respect to IUT discovery for a specific media type(s) in a registration message. In this case, masking is applied only to the media flows whose masking flag is set among all the media flows composing every (originating and terminating) session (or all sessions), which is established by the specific terminal for the term of validity of the registration. Accordingly, when another terminal sends a session discovery request message for information related to the session being performed by the specific terminal, SCC AS serving the specific terminal does not provide the another terminal with information related to the masked media flows in the session on the specific terminal.

The masking flag with respect to IUT discovery may be pre-configured in a terminal based on a user preference and/or an operator policy. The masking flag configured in the terminal may be modified by the user, or configured or modified by interaction reflecting the user preference.

If a terminal wants to set a masking flag(s) with respect to IUT discovery in a registration message, the masking flag(s) may be set by using one or more of a header field of a SIP message, or one or more of a parameter included in the header field.

2) Second method in which a terminal sets (adds, configures, places) a masking flag(s) with respect to IUT discovery (i.e., mask from IUT discovery) in a session initiation request message (e.g., SIP-based INVITE message) when sending the session initiation request message in order to initiate (originate) a session, or sets a masking flag(s) with respect to IUT discovery (i.e., mask from IUT discovery) in a session initiation accept message (e.g., SIP-based 200 OK) when sending the session initiation accept message in order to accept a session (terminating session) initiated by a remote end.

A specific terminal may set a masking flag(s) with respect to IUT discovery for a specific media type(s) in a session initiation request message or session initiation accept message. In this case, masking is applied only to the media flows whose masking flag is set among all the media flows composing the session established by the specific terminal. Accordingly, when another terminal sends a discovery request message for information related to the session which is being performed by the specific terminal, SCC AS serving the specific terminal does not provide the another terminal with information related to the masked media flows in the session on the specific terminal.

Alternatively, the specific terminal may set a masking flag(s) to the very session established (originated or terminated) in a session initiation request message or session initiation accept message. In this case, masking is applied to all media flows composing the session established by the specific terminal. Accordingly, when another terminal sends a session discovery request message for information related to the session which is being performed by the specific terminal, SCC AS serving the specific terminal does not provide another terminal with information related to the masked media flows (i.e., all of the media flows) in the session of the specific terminal.

The masking flag with respect to the IUT discovery, as aforesaid, may be pre-configured in a terminal based on a user preference and/or an operator policy. The masking flag configured in the terminal may be modified by the user or configured or modified by interaction reflecting the user preference.

When a terminal wants to set a masking flag(s) with respect to IUT discovery in the session initiation request message or session initiation accept message, the masking flag(s) may be set by using one or more of a header field of a SIP message, one or more of a parameter included in the header field or one or more of a field in a SDP body.

3) A third method in which a terminal sets (configures) a masking flag(s) with respect to IUT discovery (i.e., mask from IUT discovery) to SCC AS serving itself by using a network interface (e.g., Ut)

A specific terminal may use an interface, such as Ut, to request its serving SCC AS to set a masking flag(s) with respect to IUT discovery, to release (unset) the setting, or to set a validity (e.g., a setting residual time, setting end time, setting expiration time, etc.) of the setting for the masking flag(s) with respect to IUT discovery.

A specific terminal may set a masking flag(s) with respect to IUT discovery for a specific media type(s) to its serving SCC AS. In this case, masking is applied only to the media flows whose masking flag is set among all the media flows composing every (originating and terminating) session, which is established by the specific terminal for the term of validity of the setting. Accordingly, when another terminal sends a session discovery request message for information related to the session being performed by the specific terminal, SCC AS serving the specific terminal does not provide the another terminal with information related to the masked media flows in the session on the specific terminal.

Alternatively, a specific terminal may set a masking flag(s) with respect to IUT discovery for all media types composing the session (or the whole session) to be established for the terminal, to its serving SCC AS. In this case, masking is applied to all media flows composing every (originating and terminating) session (or all sessions), which is established by the specific terminal for the term of validity of the setting. Accordingly, when another terminal sends a session discovery request message for information related to the session which is being performed by the specific terminal, SCC AS serving the specific terminal does not provide the another terminal with information related to the masked media flows (i.e., all of the media flows) contained in the session on the specific terminal.

For use of the network interface (e.g., Ut), the masking flag(s) may be transferred by use of a message via a protocol such as XCAP, HTTP or the like.

The masking flag with respect to the IUT discovery, as aforesaid, may be pre-configured in a terminal based on a user preference and/or an operator policy. The masking flag configured in the terminal may be modified by the user or configured or modified by interaction reflecting the user preference.

4) Fourth method is to set (configure) a masking flag(s) with respect to IUT discovery (i.e., mask from IUT discovery) for one or more of a specific terminal and one or more of a specific media type in subscriber or user information (database, profile).

The subscriber information may also be defined as other terms, such as a subscriber configuration, a subscriber service configuration, a subscriber service profile, subscriber database and the like.

The method of setting a masking flag(s) with respect to IUT discovery in the subscriber information may be categorized into i) setting it (them) for a subscriber, ii) setting it (them) for a specific terminal(s), iii) setting it (them) for a specific media type(s), and iv) setting it (them) for both a specific terminal(s) and a specific media type(s).

First, if a masking flag(s) is(are) set for a subscriber, masking is applied to all media flows composing every (originating and terminating) session (or all sessions), which is established by the terminal belonging to the subscriber. Accordingly, when another terminal sends a session discovery request message for information related to the session on the terminal belonging to the subscriber, SCC AS serving the terminal does not provide another terminal with information related to all of media flows in the session on the terminal belonging to the subscriber.

Second, if a masking flag(s) is(are) set for a specific terminal(s), masking is applied to all media flows composing every (originating and terminating) session (or all sessions), which is established by the specific terminal(s). Accordingly, when another terminal sends a session discovery request message for information related to the session being performed by the specific terminal, SCC AS serving the specific terminal does not provide another terminal with information related to all of media flows in the session being performed by the specific terminal.

Thirdly, if a masking flag(s) is(are) set for a specific media type(s), masking is applied only to the media flows whose masking flag is set among all the media flows composing every (originating and terminating) session (or all sessions), which is established by every terminal belonging to the subscriber who has the masking flag(s) in subscriber information. Accordingly, when another terminal sends a session discovery request message for information related to the session being performed by the terminal belonging to the subscriber, SCC AS serving the terminal does not provide information related to the masked media flows in the session on the terminal.

Lastly, if a masking flag(s) is(are) set for both a specific terminal(s) and a specific media type(s), masking is applied only to the media flows whose masking flag is set among all the media flows composing every (originating and terminating) session (or all sessions), which is established by the specific terminal(s). Accordingly, when another terminal sends a session discovery request message for information related to the session being performed by the specific terminal, SCC AS serving the specific terminal does not provide another terminal with information related to the masked media flows in the session on the specific terminal.

In the description of the fourth method, it has been described that the masking flag with respect to IUT discovery is set to the subscriber information maintained in a subscriber information storage node such as a Home Subscriber Server (HSS); however, it may alternatively be stored in the SCC AS other than in the subscriber information storage node, or stored in another node (e.g., a dedicated database for IUT) within the home network so as to be acquired by the SCC AS.

The masking flag(s) with respect to IUT discovery may be configured, modified or released in the subscriber information based on a user preference and/or an operator policy. However, the operator policy may be run (operated, maintained, managed) independent of the subscriber information without being applied to the subscriber information. In this case, the masking flag(s) with respect to IUT discovery may be managed in the subscriber information and in the operator policy, separately. Accordingly, the SCC AS may perform masking based upon one or more of the two separate settings (configurations) (i.e., setting in the subscriber information and setting in the operator policy). If the masking flag(s) with respect to IUT discovery should be applied based on both the subscriber information setting and the operator policy setting, several application (adaptation) rules, e.g., which setting of the two has the higher priority, how to combine and apply the two, may exist. For example, when the information related to the masking flag(s) with respect to IUT discovery is not present in the subscriber information but the masking flag(s) with respect to IUT discover is set for a specific media type in the operator policy, upon requesting for information related to sessions being performed by any terminal belonging to any subscriber of the operator, the SCC AS serving the terminal may not provide information related to the media flow(s) having the masking flag set, among all the media flows in the sessions being performed by the terminal.

Also, setting (configuration), modification and release within the subscriber information may be performed in an online or offline manner.

For the operator policy, the masking flag(s) with respect to IUT discovery may be set for each subscriber, for a group of subscribers (e.g., for each charging plan or for each age), or for all subscribers same.

The masking flag on IUT discovery having described so far may be indicated with ENABLE, SET, ON, 1 or the like.

Hereinafter, description will be given of a case where when another terminal requests for discovering information related to a session being performed by a specific terminal, SCC AS, which serves the specific terminal (i.e., target terminal of discovery) to be discovered, performs masking to thereafter provide session information. However, unlike to this, SCC AS, which serves another terminal having requested for the discovery, may receive un-masked session information and information related to masking flag(s) with respect to IUT discovery from the SCC AS serving the specific terminal to be discovered, perform masking by using the received information, and thereafter provide the requested information.

For reference, even if a terminal sets a masking flag with respect to IUT discovery upon registration or session establishment, it does not mean that the terminal cannot or does not participate in the IUT operation.

The media type described in the methods 1), 2), 3) and 4) presents voice media, video media, text media and etc. However, the media type is not limited to voice, video and the like. For example, the media type described in the methods 1), 2), 3) and 4) may be replaced with the media status such as active media, held media and etc.

Also, it has been described that the masking is performed for media flows which should not be discovered. However, on the contrary, unmasking may be performed for media flows to be discoverable. In this case, an unmasking flag(s) with respect to IUT discovery other than the masking flag(s) may be set, modified or released. For example, for employing the method 4), if the unmasking flag(s) with respect to IUT discovery (i.e., unmask from IUT discovery) has been set in subscriber information for a specific terminal, only session information related to the terminal whose unmasking flag is set may be provided.

Meanwhile, when masking information related to the session being performed by the specific terminal or a part of media flows in the ongoing session and thereafter providing the masked information, other supplementary information may also be provided, and such information may also be masked or unmasked. Types of information to be masked or unmasked are listed but not to limited to as follows.

session identifier
source UE identifier (e.g., GRUU or IMPU)
remote end identifier
identity of the controller UE for the related collaborative session
media type (voice, video, etc.)
media status (held, active, etc.)
media flow identifier
service identifier for the service the session is related to The masking or unmasking for such information (or called as field, parameter, etc.), which is included when providing information to a terminal performing a session discovery, may be performed separately from the masking or unmasking information related to the ongoing session or part of media flows composing the session from discovery by another terminal. Here, one or more of the aforesaid four methods can be used to mask or unmask for such supplementary information.

The masking flag (i.e., mask from IUT discovery) mentioned above may be referred to as a filtering flag (i.e., filter from IUT discovery). The term 'masking' and 'unmasking' may be replaced with 'filtering' and 'unfiltering', respectively.

Hereinafter, detailed description thereof will be given with reference to the accompanying drawings.

Figure 5:
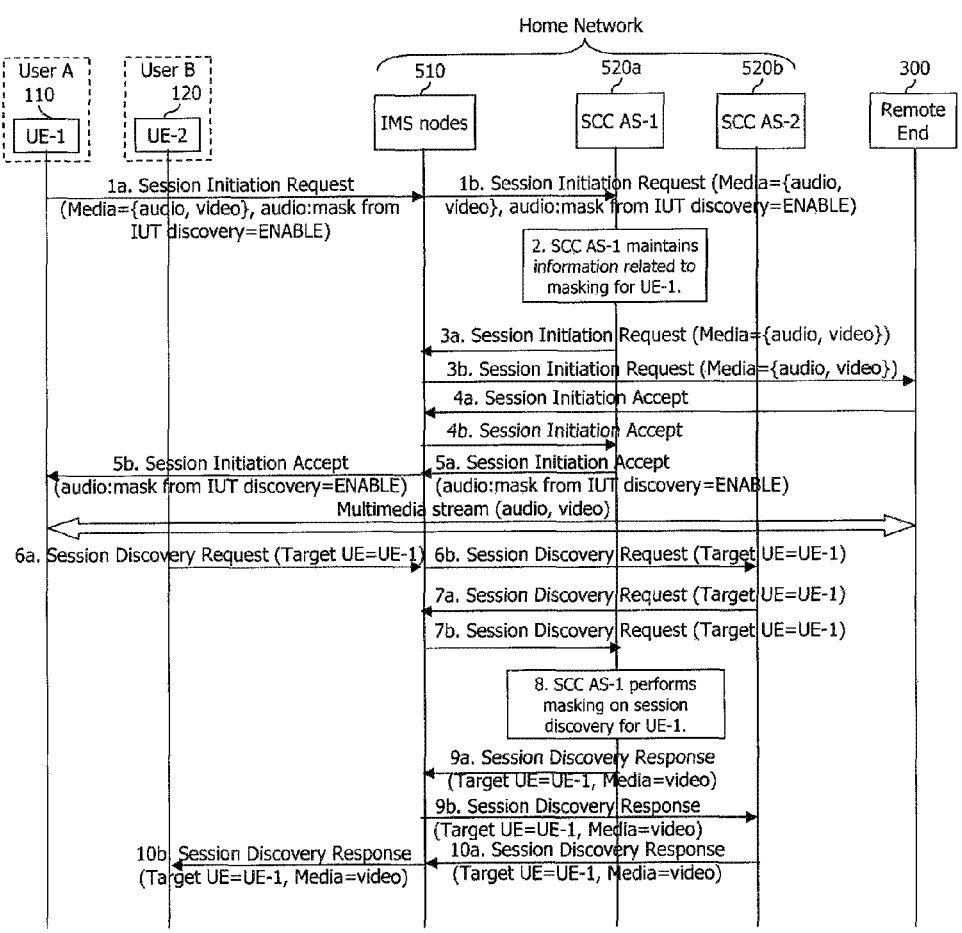
FIG. 5 is an exemplary flowchart showing a method for masking (filtering) information related to specific media flows in a session being performed by a specific terminal from being discovered (retrieved, found) by another terminal.
Figure 6:
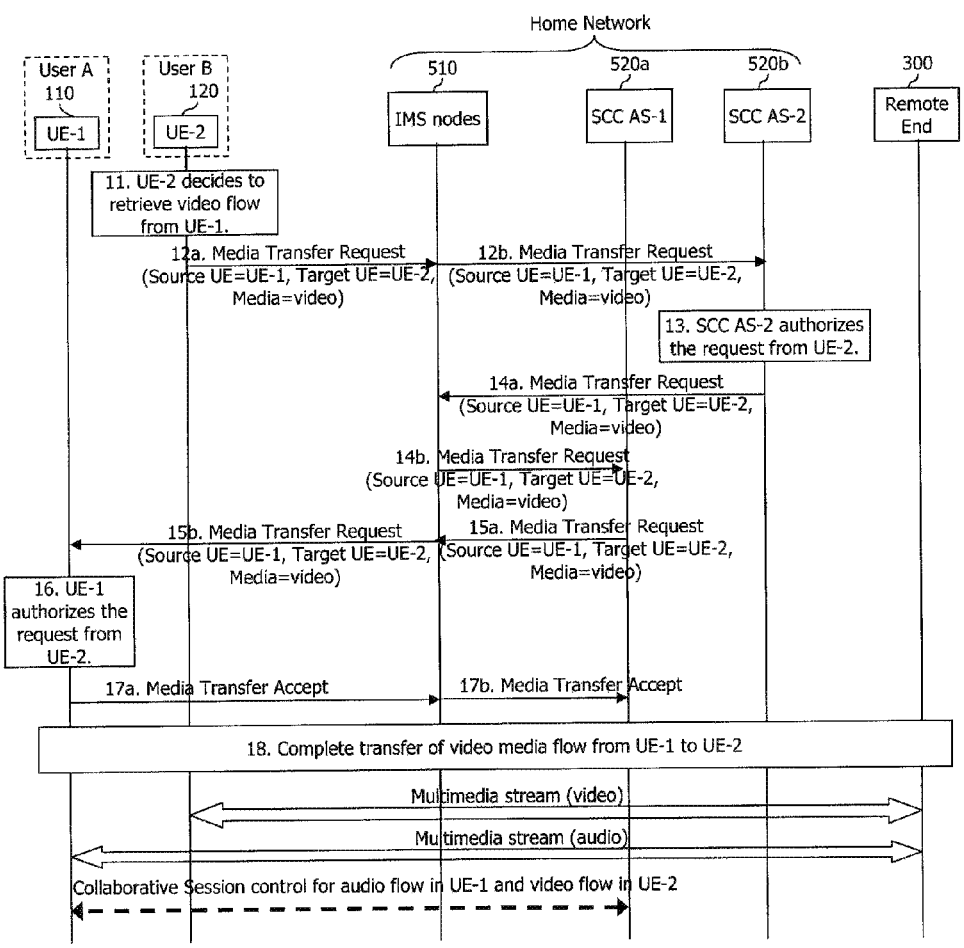
FIG. 6 is an exemplary flowchart showing a process that in a state where the information related to the specific media flows are masked (filtered) from discovery (retrieval) by another terminal according to FIG. 5, the another terminal requests for transfer of media flows except for the specific media flows.

FIG. 5 is an exemplary flowchart showing a method for masking (filtering) information related to specific media flows in a session being performed by a specific terminal from being discovered (retrieved, found) by another terminal. FIG. 6 is an exemplary flowchart showing a process that in a state where the information related to the specific media flows are masked (filtered) from discovery (retrieval) by another terminal according to FIG. 5, the another terminal requests for transfer of media flows except for the specific media flows.

As shown in FIGS. 5 and 6, a user A has UE-1 110 and a user B has UE-2 120. However, this is merely illustrative, and the following description will not be changed even if it is assumed that the user A has both UE-1 and UE-2.

Referring to FIGS. 5 and 6, a home network to which the users A and B have subscribed is shown. The home network may include IP Multimedia Subsystem (IMS) nodes 510 including S-CSCF, an SCC-AS-1 520a serving the UE-1 110, and an SCC AS-2 520b serving the UE-2 120. Although not shown in detail in FIGS. 5 and 6, the same S-CSCF may serve both the UE-1 110 and the UE-2 120, or different S-CSCFs may serve the UE-1 110 and the UE-2 (for example, S-CSCF-1 may serve the UE-1 belonging to the user A and S-CSCF-2 may serve the UE-2 belonging to the user B).

Although not shown in FIG. 5, it is assumed that the UE-1 110 of the user A registers in the home network, and the UE-2 120 also registers in the home network.

Here, FIG. 5 exemplarily shows the method of setting a masking flag with respect to IUT discovery (i.e., mask from IUT discovery) through a session initiation request message, among the aforesaid methods. That is, when the UE-1 110 of the user A sends a session initiation request message in order to establish a session including audio and video media with the remote end 300, the UE-1 110 enables the masking flag with respect to IUT discovery (i.e., mask from IUT discovery) for audio media for the SCC AS-1 520a not to provide information related to the audio media flow.

Detailed description will be made with reference to FIG. 5.

1a~1b) The user A desires to perform a session containing audio and video media with the remote end 300 via the UE-1 110. Hence, the UE-1 110 sends a session initiation request message (e.g., SIP-based INVITE message) to the IMS nodes 510, and the IMS nodes 510 then forward the session initiation request message to the SCC AS-1 520a based upon subscriber information on the user A. The session initiation request message may include information related to media composing the session, namely, information related to audio and video. The information related to the media may be included in a SDP body.

Explaining an exemplary format included in the SDP body with reference to document RFC 4566, it will be described as follows.

m=<media><port>/<number of ports><proto><fmt> . . .

For example, it may be written in a format of m=video 49170/2 RTP/AVP 31.

As another example, the SDP format may be described as follows.

TABLE 1 v=0
o=jdoe 2890844526 2890842807 IN IP4 10.47.16.5
s=SDP Seminar
i=A Seminar on the session description protocol
u=http://www.example.com/seminars/sdp.pdf
e=j.doe@example.com (Jane Doe)
c=IN IP4 224.2.17.12/127
t=2873397496 2873404696
a=recvonly
m=audio 49170 RTP/AVP 0
m=video 51372 RTP/AVP 99
a=rtpmap:99 h263-1998/90000

Also, in order to prevent the audio media flow among audio and video media flows composing the session to be established from being discovered by another terminal, a masking flag with respect to IUT discovery (i.e., mask from IUT discovery) for the audio media may be set (enabled) in the session initiation request message.

2) Upon receipt of the session initiation request message sent from the UE-1 110, the SCC AS-1 520a stores information related to the media, namely, information related to audio and video media, included in the session initiation request message, and checks whether there exists any masking flag with respect to IUT discovery which has been set. As such, the SCC AS-1 520a stores the masking flag with respect to IUT discovery enabled for the audio media.

3a~3b) The SCC AS-1 520a forwards the session initiation request message to the remote end 300 via the IMS nodes 510.

Here, the masking information with respect to IUT discovery is needed only in the SCC AS-1 520*a*, so the masking flag is not included in the session initiation request message forwarded to the remote end 300.

4a~4b) Upon receipt of the session initiation request message, the remote end 300 sends a session initiation accept message (e.g., SIP-based 200 OK) to the SCC AS-1 520*a* via the IMS nodes 510.

5a~5b) The SCC AS-1 520*a* then forwards the session initiation accept message sent by the remote end 300 to the UE-1 110 via the IMS nodes 510. Here, the SCC AS-1 520*a* may include in the session initiation accept message a flag for indicating whether it is capable of supporting a masking flag with respect to IUT discovery for the audio media included in the session initiation request message sent by the UE-1 110, for example, a masking flag with respect to IUT discovery. Alternatively, the SCC AS-1 520*a* may send the session initiation accept message by disabling the masking flag with respect to IUT discovery only when it is not capable of supporting the masking flag with respect to IUT discovery in the session initiation request message. In this case, if the SCC AS-1 520*a* can support the masking flag with respect to IUT discovery, the session initiation accept message may be sent without any flag related to masking information.

In the meantime, upon receiving the session initiation accept message, a session containing audio and video media is established between the UE-1 110 and the remote end 300. Here, the SCC AS-1 520*a* serving the UE-1 110 maintains information related to the session established between the UE-1 110 and the remote end 300. The maintained information may include one or more of session identifier, source UE identifier (e.g., GRUU or IMPU), remote end identifier, media type (voice, video, etc.), media status (held, active, etc.), media flow identifier, service identifier for the service the session is related to. Other various information as well as those information may also be maintained by the SCC AS-1 520*a*.

6a~6b) In order to perform the IUT operation according to the instruction of the user B, the UE-2 120 sends a session discovery request message, (e.g., SIP-based SUBSCRIBE message) for discovering the session being performed by the UE-1 110, to the SCC AS-2 520*b* via the IMS nodes 510. The session discovery request message may include information related to the UE-1 to be discovered.

7a~7b) The SCC AS-2 520*b* forwards the session discovery request message to the SCC AS-1 520*a* serving the UE-1 110 via the IMS nodes 510.

8) The SCC AS-1 520*a* checks whether the UE-2 120 has a right to (is allowed to, is permitted to) discover information related to the session being performed by the UE-1 110. The checking may be performed based upon subscriber information. The SCC AS-1 520*a* checks which kind of media flows are contained in the ongoing session on the UE-1 110 based upon the previously stored session information. The SCC AS-1 520*a* decides media flows, which should not be discovered (i.e., should be masked), among all of the media flows in the ongoing session on the UE-1 110, based upon the previously stored information related to the masking from IUT discovery. The SCC AS-1 520*a* then generates a session discovery response message (e.g., SIP-based NOTIFY message) based upon the decision for masking. Here, the SCC AS-1 520*a* masks or filters the information related to the decided media flows among all the media flows contained in the session on UE-1 110 and does not include the masked or filtered information in the session discovery response message. In other words, the SCC AS-1 520*a* includes information related only to the rest of media flow(s) except for the masked or filtered media flow(s) among all the media flows in the session on UE-1 110, in the session discovery response message. In FIG. 5, the discovery response message includes, for example, information related only to video media flow among the media flows in the ongoing session on the UE-1 110, without information related to audio media flow.

9a~9b) The SCC AS-1 520*a* then sends the session discovery response message to the SCC AS-2 520*b* via the IMS nodes 510.

10a~10b) The SCC AS-2 520*b* forwards the session discovery response message to the UE-2 120 via the IMS nodes 510.

11) Meanwhile, referring to FIG. 6, after receipt of the session discovery response message, the UE-2 120 decides to take the video media flow from the UE-1 110 based upon the discovery result, namely, the information related to the video media flow, included in the session discovery response message.

12a~12b) In order to take the video media flow from the UE-1 110, the UE-2 120 sends a transfer request message, e.g., Media Transfer Request message (e.g., SIP-based REFER message) to the SCC AS-2 520*b* via the IMS nodes 510. Also, the transfer request message includes a parameter indicating a source terminal, e.g., Source UE parameter. Also, the transfer request message includes a parameter indicating a target terminal, e.g., Target UE parameter. The transfer request message also includes a parameter indicating media to be transferred, e.g., Media parameter. Besides, the transfer request message may further include various parameters needed for the media transfer. The transfer request message may further include a parameter indicating that the control for a Collaborative Session which the UE-1 110 and the UE-2 120 will participate in, is kept in the UE-1 110 (i.e., a parameter indicating that the UE-2 120 does not want to take the control for the Collaborative Session), e.g., Collaborative Session Control parameter. If the transfer request message does not include the parameter for the control, e.g., Collaborative Session Control parameter, it may be conceived that the UE-2 120 does not want to take the Collaborative Session Control. This embodiment illustrates that the UE-2 does not take the control for the Collaborative Session to be established. However, if the UE-2 120 wants to take the Collaborative Session Control, a parameter for indicating the transfer of the control may be included in the transfer request message. Also, the transfer of the Collaborative Session Control may be performed separately from the transfer of the media flows, as shown in FIG. 1(*b*).

13) Upon receipt of the transfer request message, the SCC AS-2 520*b* authorizes or verifies the transfer request message. The authorization or verification may be performed based upon subscriber information. The authorization or verification may be performed to check whether the UE-2 120 is allowed for the IUT operation or is capable of the IUT operation. In addition, the authorization or verification may be performed to check whether the media flows in the session on the UE-1 110 can be transferred to the UE-2 120. If information related to the authorization for the IUT operation is not present in the subscriber information or SCC AS serving a target UE of the IUT operation does not need the authorization or verification, the step 13 may not be performed.

14a~14b) After the authorization or verification, the SCC AS-2 520*b* checks the information included in the transfer request message, and then forwards the transfer request message via the IMS nodes 510 to the SCC AS-1 520*a* serving the UE-1 110 as a source UE of the session, to which the video media requested to be transferred belongs.

15a~15b) Upon receipt of the transfer request message, the SCC AS-1 520*a* checks the information included in the transfer request message. If it is checked that the session, to which the video media requested to be transferred belong, is the session on the UE-1 110, the SCC AS-1 520*a* forwards the transfer request message to the UE-1 110 via the IMS nodes 510.

16) The UE-1 110 then authorizes or verifies the transfer request message sent by the UE-2 120. The authorization or verification may be performed through interaction with the user, or based upon information pre-configured in the UE-1 110 without interaction with the user. The authorization or verification may be performed additionally or alternatively by the SCC AS-1 520*a* based upon subscriber information. In other words, the UE-1 110 may perform the authorization or verification, or the SCC AS-1 520*a* may perform it based upon setting in subscriber information. Alternatively, both the UE-1 110 and the SCC AS-1 520*a* may perform it.

17a~17b) Upon accepting the transfer request for the video media flow, the UE-1 110 sends a transfer request accept message to the SCC AS-1 520*a* via the IMS nodes 510.

18) As the UE-1 110 accepts the transfer of the video media flow to the UE-2 120, the SCC AS-1 520*a* completes the transfer of the video media flow from the UE-1 110 to the UE-2 120.

Thusly, as the video media flow is transferred from the UE-1 110 to the UE-2 120, a Collaborative Session in which both the UE-1 110 and the UE-2 120 take part, is established. Even after transferring the video media flow to the UE-2 120, the UE-1 110 has the control for the Collaborative Session containing the audio media on itself and the video media on the UE-2 120. That is, the UE-1 110 becomes a Controller UE, and the UE-2 120 becomes a Controllee UE.

Figure 7:
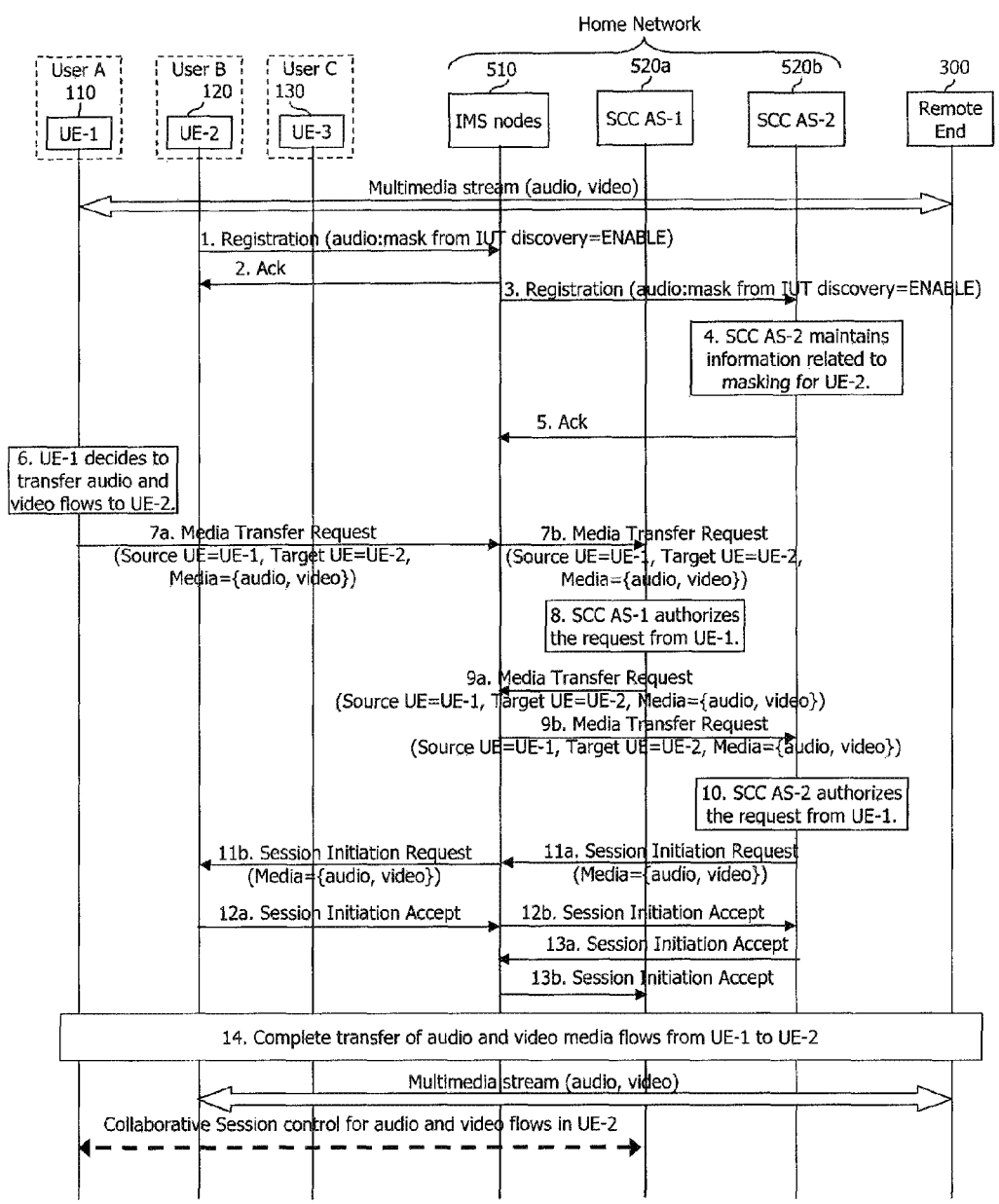
FIG. 7 is an exemplary flowchart showing another method for masking (filtering) information related to specific media flows in a session being performed by a specific terminal from being discovered by another terminal.
Figure 8:
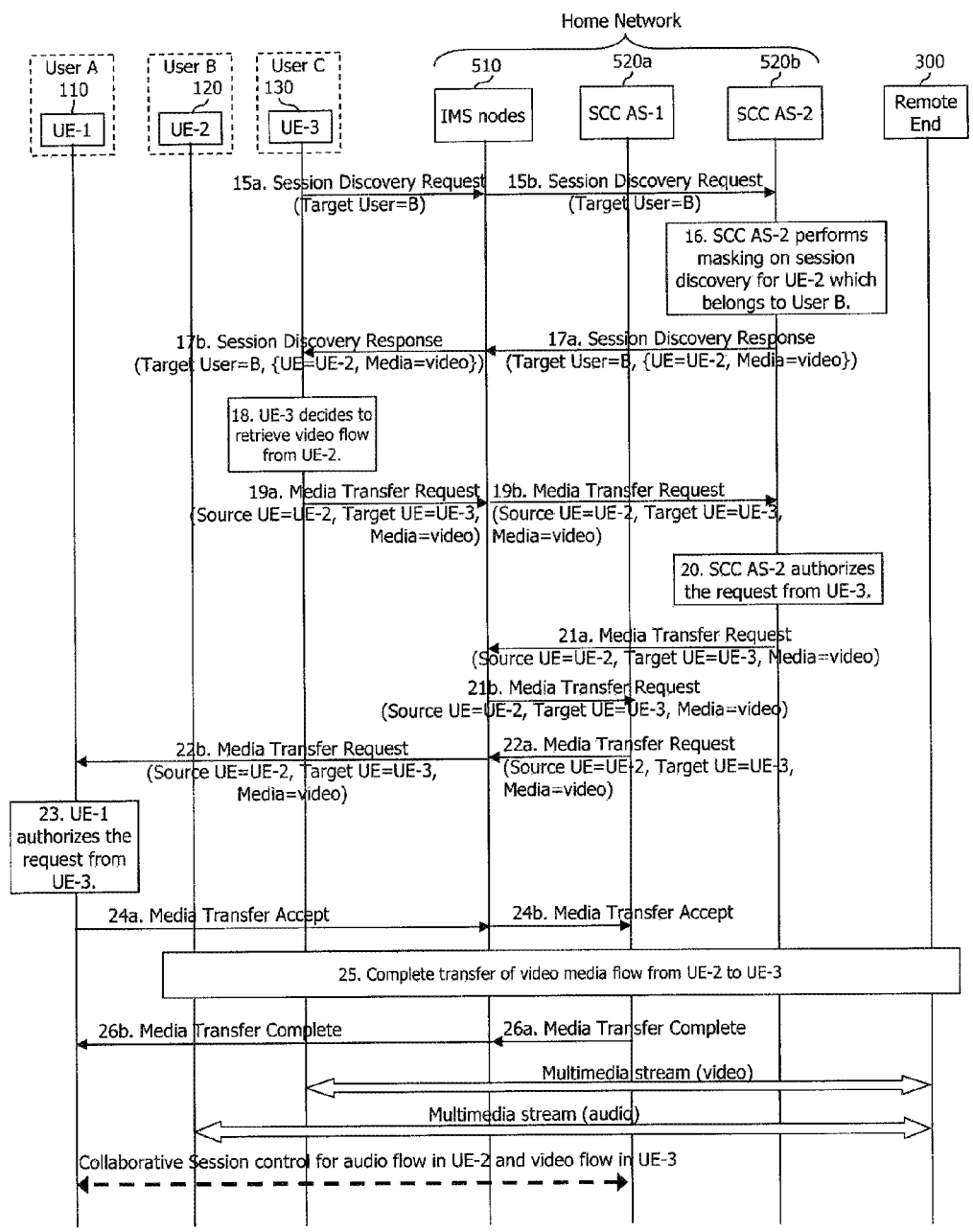
FIG. 8 is an exemplary flowchart showing a process that in a state where the information related to the specific media flows are masked (filtered) from discovery (retrieval) by another terminal according to FIG. 7, the another terminal requests for transfer of media flows except for the specific media flows.

FIG. 7 is an exemplary flowchart showing another method for masking (filtering) information related to specific media flows in a session being performed by a specific terminal from being discovered by another terminal;

FIG. 8 is an exemplary flowchart showing a process that in a state where the information related to the specific media flows are masked (filtered) from discovery (retrieval) by another terminal according to FIG. 7, the another terminal requests for transfer of media flows except for the specific media flows.

Referring to FIGS. 7 and 8, UE-1 110 belongs to a user A, UE-2 120 belongs to a user B, and UE-3 130 belongs to a user C. FIGS. 7 and 8 also show a home network to which the users A, B and C have subscribed. The home network may include IP Multimedia Subsystem (IMS) nodes 510 including S-CSCF, an SCC-AS-1 520*a* serving the UE-1 110, and an SCC AS-2 520*b* serving the UE-2 120 and the UE-3 130. For the S-CSCF, although not shown in detail in FIGS. 7 and 8, the same S-CSCF may serve UE-1, UE-2 and UE-3, or different S-CSCFs may serve UE-1, UE-2 and UE-3 (for example, S-CSCF-1 may serve the UE-1 110 belonging to the user A, S-CSCF-2 may serve the UE-2 120 belonging to the user B, and S-CSCF-3 serves the UE-3 130 belonging to the user C. As another example, S-CSCF-1 serves the UE-1 110 belonging to the user A and S-CSCF-2 serves the UE-2 120 belonging to the user B and the UE-3 130 belonging to the user C).

FIG. 7 exemplarily shows the method of setting a masking flag with respect to IUT discovery (i.e., mask from IUT discovery) upon registration in the home network, among the aforesaid methods.

Detailed description will be given as follows.

1) First, it is assumed that the UE-1 110 and the UE-3 130 have already registered in the home network, and the UE-1 110 is performing a session containing audio and vide media flows with the remote end 300.

Under this state, the UE-2 120 sends a registration request message, e.g., REGISTER message to the IMS nodes 510 to register in its home network. Here, the registration request message has a masking flag with respect to IUT discovery (i.e., mask from IUT discovery) enabled (set) for audio media.

2~3) The IMS nodes 510 then send an acknowledgement message in response to the registration message sent by the UE-2 120. The IMS nodes 510 then perform a third-party registration to the SCC AS-2 520*b* based upon subscriber information on the user B. Here, the registration message includes the masking flag with respect to IUT discovery (i.e., mask from IUT discovery) enabled for the audio media.

4) The SCC AS-2 520*b* then checks the registration message to find the existence of any masking flag with respect to IUT discovery enabled, and accordingly decides that the audio media contained in all the sessions established by the UE-2 120 for the term of validity of the registration should not be discovered by another terminals. Then, the SCC AS-2 520*b* maintains the masking-related information for the UE-2 120.

5) The SCC AS-2 520*b* sends an acknowledgement message to the IMS nodes 510 in response to the registration message. Here, the SCC AS-2 520*b* may include in the acknowledgement message a flag for indicating whether it is capable of supporting a masking flag with respect to IUT discovery (i.e., mask from IUT discovery) for the audio media. On the contrary, the SCC AS-2 520*b* may send the acknowledgement message by disabling the masking flag with respect to IUT discovery only when it cannot support the masking flag with respect to IUT discovery included in the registration message. In this case, if the SCC AS-2 520*b* can support the masking flag with respect to IUT discovery included in the registration message, the SCC AS-2 520*b* may send the acknowledgement message without any flag related to masking information. Upon receipt of the acknowledgement message, if it is checked through the acknowledgement message that the masking with respect to IUT discovery is not supported, the IMS nodes 510 may notify it to the UE-2 120 immediately or later (e.g., when the UE-2 initiates (originates) a session). Those operations are similar to those in the foregoing description, so a detailed description thereof will be omitted.

6) Meanwhile, the UE-1 110 decides to transfer audio and video media flows to the UE-2 120.

7a~7b) In order to transfer the audio and video media flows to the UE-2 120, the UE-1 110 then sends a transfer request message, e.g., Media Transfer Request message (e.g., SIP-based REFER message) to the SCC AS-1 520*a* via the IMS nodes 510. Here, the transfer request message includes a parameter indicating a source terminal, e.g., Source UE parameter. Also, the transfer request message include a parameter indicating a target terminal, e.g., Target UE parameter. The transfer request message includes a parameter indicating media to be transferred, e.g., Media parameter. Besides, the transfer request message may further include various parameters needed for the media transfer. The transfer request message may further include a parameter indicating that the control for a Collaborative Session which the UE-1 110 and the UE-2 120 will participate in, is kept in the UE-1 110 (i.e., a parameter indicating that the UE-2 120 does not want to take the control for the Collaborative Session), e.g., Collaborative Session Control parameter. If the transfer request message does not include the parameter for the control, e.g., Collaborative Session Control parameter, it is assumed that the Collaborative Session Control is not transferred to the UE-2 120.

8) The SCC AS-1 520*a* then authorizes or verifies the transfer request message sent by the UE-1 110. The authorization or verification may be performed based upon subscriber information. The authorization or verification may be performed to check whether the UE-1 110 is allowed to perform the IUT operation or is capable of the IUT operation. In addition, the authorization or verification may be performed to check whether the media flows in the session on the UE-1 110 can be transferred to the UE-2 120.

9a~9b) The SCC AS-1 520*a* then forwards the transfer request message to the SCC AS-2 520*b* via the IMS nodes 510.

10) The SCC AS-2 520*b* authorizes or verifies the transfer request message. The authorization or verification may be performed based upon subscriber information, which is similar to the aforesaid description, so a detailed description thereof will be omitted.

11a~11b) The SCC AS-2 520*b* sends a session initiation request message (e.g., SIP-based INVITE message) including information related to audio and video media flows requested to be transferred to the UE-2 120 via the IMS nodes 510, based upon the transfer request message. The session initiation request message may include contents as shown in Table 1.

12a~12b) The UE-2 120 sends an accept message in response to the session initiation request message to the SCC AS-2 520*b* via the IMS nodes 510.

13a~13b) The SCC AS-2 520*b* forwards the session initiation accept message to the SCC AS-1 520*a* via the IMS nodes 510.

14) Accordingly, the SCC AS-1 520*a* completes the transfer of the audio and video media flows from the UE-1 110 to the UE-2 120 based upon the session initiation accept message. Here, even after transferring the audio and video media flows to the UE-2 120, the control for the media flows still belongs to the UE-1 110. That is, a Collaborative Session is established in which the UE-1 110 and the UE-2 120 are involved, and the UE-1 becomes a Controller UE while the UE-2 becomes a Controllee UE.

Meanwhile, the SCC AS-1 520*a* serving the UE-1 110 maintains information related to the Collaborative Session in which the UE-1 110 and the UE-2 120 take part. Here, the maintained information may include one or more of session identifier, source UE identifier (e.g., GRUU or IMPU), remote end identifier, Controller UE identifier of the Collaborative Session, media type (e.g., voice, video, etc.), media status (e.g., held, active, etc.), media flow identifier, source UE identifier for media on a local end, and service identifier for the service the session is related to. Further, other various information as well as those information may also be maintained by the SCC AS-1 520*a*.

Similarly, the SCC AS-2 520*b* serving the UE-2 120 also maintains information related to the Collaborative Session in which the UE-1 110 and the UE-2 120 take part, which will be understood as the same as being described above.

The detailed description will be continued as follows with reference to FIG. 8.

15a~15b) In order to perform the IUT operation, the UE-3 130 first sends a session discovery request message, e.g., Session Discovery Request message (e.g., SIP-based SUBSCRIBE message), to the SCC AS-2 520*b* via the IMS nodes 510 to discover information related to the ongoing session of the terminal belonging to the user B.

16) The SCC AS-2 checks whether the UE-3 130 has a right to (is allowed to, is permitted to) discover information related to the session being performed by the UE-2 120. The checking may be performed based upon subscriber information. The SCC AS-2 520*b* then checks which kind of media flows are contained in the ongoing session on the UE-2 120 based upon the previously stored session information. The SCC AS-2 520*b* then decides media flows, which should not be discovered (i.e., should be masked), among all of the media flows in the ongoing session on the UE-2 120, based upon the previously stored information related to the masking from IUT discovery. The SCC AS-2 520*b* generates a session discovery response message (e.g., SIP-based NOTIFY message), based upon the decision for masking. Here, the SCC AS-2 520*b* masks or filters the information related to the decided media flows among all the media flows contained in the session on UE-2 120 and does not include the masked or filtered information in the session discovery response message. In other words, the SCC AS-2 520*b* includes in the session discovery response message information related only to the rest of media flows except for the masked or filtered media flows among the media flows in the session on UE-2 120. That is, since the audio media flow in the session being performed by the UE-2 120 should not be discovered by other terminals, the audio media flow is masked or filtered. Accordingly, only information related to the video media flow is included in the session discovery response message, without information related to the audio media flow.

17a~17b) Afterwards, the SCC AS-2 520*b* sends the session discovery response message to the UE-3 130 via the IMS nodes 510.

18) The UE-3 130 checks the session discovery response message and decides to take the video media flow from the UE-2 120 based upon the discovery result.

19a~19b) In order to take the video media flow from the UE-2 120, the UE-3 130 sends a transfer request message, e.g., Media Transfer Request message (e.g., SIP-based REFER message) to the SCC AS-2 520*b* via the IMS nodes 510. Here, the transfer request message may include the aforesaid parameters needed for the media transfer.

20) Upon receipt of the transfer request message from the UE-3 130, the SCC AS-2 520*b* authorizes or verifies the transfer request message, which will similarly be understood by the foregoing description, so a detailed description thereof will not be repeated.

21a~21b) The SCC AS-2 520*b* forwards the transfer request message to the SCC AS-1 520*a*, which serves the UE-1 110 as a Controller UE of the Collaborative Session to which the transfer-requested video media flow belongs. To this end, upon receipt of the transfer request message, the SCC AS-2 520*b* checks whether the session to which the transfer-requested video media flow belongs is a Collaborative Session. Here, whether the session to which the transfer-requested video media flow belongs is a Collaborative Session may be determined based upon a parameter which is included in the received transfer request message to explicitly indicate a Collaborative Session or non-Collaborative Session (i.e., an indicator indicating that the session is a Collaborative Session, or information related to the Controller UE for the session, etc.). Alternatively, it may be determined based upon information related to the corresponding session maintained by the SCC AS-2 520*b*, by using another parameter (e.g., session identifier) included in the transfer request message. Also, the information related to the Controller UE may be included in the transfer request message or obtained based upon information related to the corresponding session maintained by the SCC AS-2 520*b*, by using another parameter (e.g., session identifier) included in the transfer request message.

22a~22b) Upon receipt of the transfer request message, the SCC AS-1 520*a* checks whether the session, to which the transfer-requested video media flow belongs, is a Collaborative Session. If the session is a Collaborative Session, the SCC AS-1 520*a* forwards the transfer request message to the UE-1 110 as the Controller UE of the Collaborative Session. Here, whether the session to which the transfer-requested video media flow belongs is a Collaborative Session may be determined based upon a parameter which is included in the received transfer request message to explicitly indicate a Collaborative Session or non-Collaborative Session (i.e., an indicator indicating that the session is a Collaborative Session, or information related to the Controller UE for the session, etc.). Alternatively, it may be determined based upon information related to the corresponding session maintained by the SCC AS-1 520*a*, by using another parameter (e.g., session identifier) included in the transfer request message. Also, the information related to the Controller UE may be included in the transfer request message or obtained based upon information related to the corresponding session maintained by the SCC AS-1 520*a*, by using another parameter (e.g., session identifier) included in the transfer request message.

23) The UE-1 110 then authorizes or verifies the transfer request message sent by the UE-3 130. The authorization or verification may be performed through interaction with the user, or based upon information pre-configured in the UE-1 110 without interaction with the user, which will similarly be understood by the foregoing description, so a detailed description will be omitted.

24a~24b) The UE-1 110 then sends a request accept message to the SCC AS-1 520*a* via the IMS nodes 510 in response to the transfer request message.

25) As the UE-1 110 accepts the transfer of the video media flow from the UE-2 120 to the UE-3 130, the SCC AS-1 520*a* completes the transfer of the video media flow from the UE-2 120 to the UE-3 130.

26a~26b) The SCC AS-1 520*a* then sends a transfer complete message, e.g., Media Transfer Complete message to the UE-1 110 as the Controller UE via the IMS nodes 510.

Through those processes, as the video media flow is transferred from the UE-2 120 to the UE-3 130, the UE-3 130 joins the Collaborative Session in which the UE-1 110 and the UE-2 120 have been involved. Even after the transfer of the video media flow to the UE-3 130, the UE-1 110 has the control for the Collaborative Session containing the audio media flow on the UE-2 120 and the video media flow on the UE-3 130. That is, the UE-1 110 keeps acting as a Controller UE and the UE-3 130 becomes a Controllee UE. The UE-2 120 keeps acting as a Controllee UE.

Figure 9:
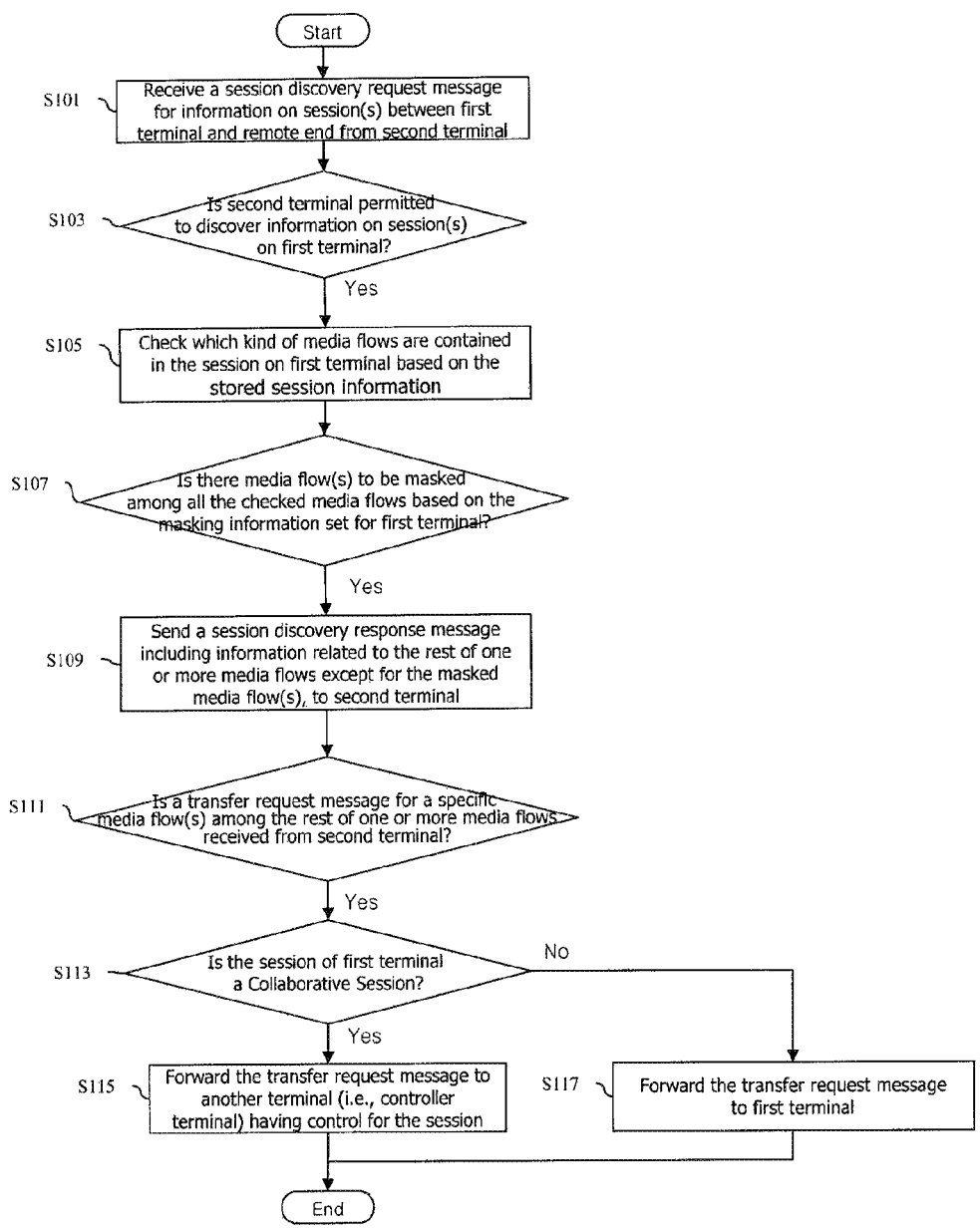
FIG. 9 is a flowchart briefly showing the method according to the present disclosure.

FIG. 9 is a flowchart briefly showing the method according to the present disclosure.

As show in FIG. 9, upon receiving from a second terminal a session discovery request message for information related to the session(s), which is being performed between at least one first terminal and a remote end (S101), it is checked whether the second terminal is permitted (allowed) to discover information related to the session(s) on the first terminal (S103). If permitted, based up the stored information related to the session(s) on the first terminal it is checked which kind of media flows are contained in the session on the first terminal (S105). It is then decided which media flow(s) among all the media flows in the session on the first terminal should be masked or filtered, based upon the stored information related to the masking from IUT discovery, configured for the first terminal (S107). If there exists the media flow(s) which should be masked or filtered, a session discovery response message including information related only to the rest of one or more media flow(s) except for the masked or filtered media flow(s) among all the media flows in the session on the first terminal is generated and sent to the second terminal (S109).

Afterwards, a transfer request message for a specific media flow(s) among the rest of one or more media flows is received from the second terminal (S111). Whether or not the session containing the media flow(s) requested to be transferred is a Collaborative Session is checked (S113), and if so, the transfer request message is forwarded to a controller terminal having a Collaborative Session Control (S115). However, if not, the transfer request message is forwarded to the first terminal (S117).

In regard of those processes of FIGS. 4, 5 and 8, namely, the transmission of the session discovery request message (steps 9a~10b of FIG. 4, steps 6a~7b of FIG. 5 and steps 15a~15b of FIG. 8), and the transmission of the session discovery response message (steps 11a~12b of FIG. 4, steps 9a~10b of FIG. 5, and steps 17a~17b of FIG. 8), instead of the aforesaid method that the terminal sends the session discovery request message to the SCC AS and in response the SCC AS sends the session discovery response message containing session information to the terminal, a method may be employed such that when the terminal sends the session discovery request message to the SCC AS, the SCC AS first sends an acknowledgement message (e.g., SIP-based 200 OK) to the terminal to notify the successful reception of the session discovery request message and then sends the session discovery response message containing the session information to the terminal, accordingly, the terminal sends an acknowledgement message (e.g., SIP-based 200 OK) to the SCC AS to notify the successful reception of the session discovery response message.

For a plurality of sessions being performed by one terminal, SCC AS performs masking from IUT discovery for all the sessions being performed by the terminal.

Also, as a result of masking from IUT discovery performed by SCC AS, it may happen that all the media flows contained in the session being performed by the terminal, which is a target for session information discovery, are masked. In this case, the SCC AS may not include information related to the session in the session discovery response message (i.e., masking the session itself), or include only information related to the existence of the session without information related to the masked media flows.

In FIGS. 5, 8 and 9, as described above, masking from IUT discovery is performed by SCC AS prior to generating the session discovery response message in response to the session discovery request message sent by another terminal. However, unlike to this manner, as a certain terminal subscribes to a session information announcement service, masking from IUT discovery may be performed by SCC AS when sending a session information announcement (notification) message to the subscribed terminal. For example, in case where the first terminal has subscribed to an announcement service for receiving session information related to the second terminal (or every terminal of the user having the second terminal) from a network periodically or when there is any change in information related to the session(s) being performed by the second terminal (or every terminal of the user having the second terminal) (e.g., in case of the first terminal subscribing to a dialog event packet through SIP-based SUBSCRIBE message), the SCC AS may perform masking for the session(s) on the second terminal (or on every terminal of the user having the second terminal) prior to sending a session information announcement (notification) message (e.g., SIP-based NOTIFY message) to the first terminal. Here, as a result of making from IUT discovery performed by SCC AS, it may happen that all the media flows contained in the session being performed by the terminal, whose session information is to be discovered, are masked. In this case, the SCC AS may not send a session information announcement (notification) message to the first terminal at all, or may send a session information announcement (notification) message including only information related to the existence of the session without information related to the masked media flows.

In the exemplary flowcharts showed in FIGS. 5, 6, 7 and 8, other IUT operations such as media replication than media transfer may be applied.

Meanwhile, the method according to this specification, as described so far, can be implemented by hardware or software, or any combination thereof. For example, the method according to the present invention may be stored in a storage medium (e.g., an internal memory of a mobile terminal, a flash memory, a hard disc, etc.). Alternatively, the method according to the present invention can be implemented as codes or command words within a software program capable of being executed by a processor (e.g., a microprocessor in a mobile terminal).

Figure 10:
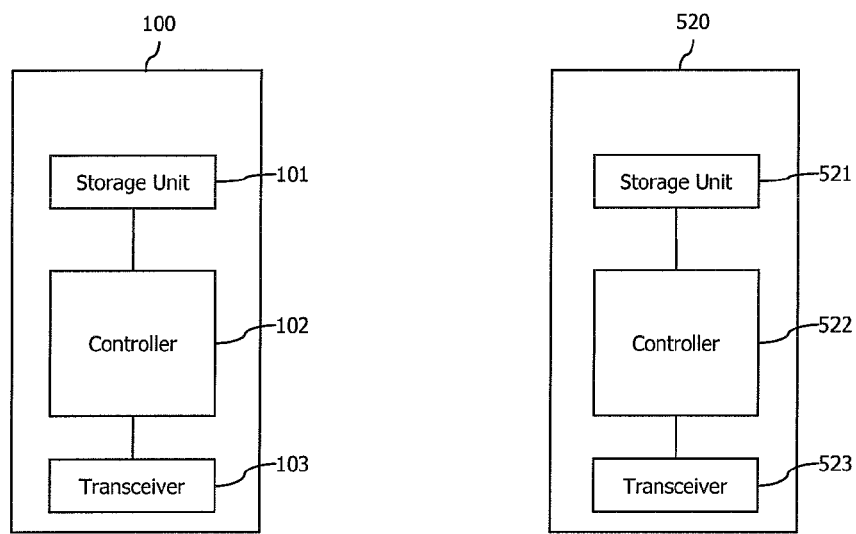
FIG. 10 is a block diagram of UE 100 and SCC AS 520.

FIG. 10 is a block diagram of UE 100 and SCC AS 520.

As shown in FIG. 10, the UE 100 may include a storage unit 101, a controller 102 and a transceiver 103. The SCC AS 520 may include a storage unit 521, a controller 522 and a transceiver 523.

The storage units 101, 521 may store those methods shown in FIGS. 4 to 9.

The controllers 102, 522 may control the storage units 101, 521 and the transceiver 103, 523. Especially, the controller 102, 522 may execute the methods stored in the storage units 101, 521, respectively. The controllers 102, 522 may send those aforesaid signals via the transceivers 103, 523, respectively.

The present invention has been explained with reference to the embodiments which are merely exemplary. It will be apparent to those skilled in the art that various modifications and equivalent other embodiments can be made in the present invention without departing from the spirit or scope of the invention. Also, it will be understood that the present invention can be implemented by selectively combining the aforementioned embodiment(s) entirely or partially. Thus, it is intended that the present invention cover modifications and variations of this invention provided they come within the scope of the appended claims and their equivalents.

What is claimed is:

1. A method for controlling a session in a Service Centralization and Continuity Application Server (SCC AS) which controls the session being performed between at least one first terminal and a remote end, the method comprising:
    receiving a session discovery request message for acquiring information related to the session being performed between the at least one first terminal and a remote end from a second terminal;
    filtering information of one or more media flows of the session based on information related to at least one of user related information or operator policy;
    transmitting a session discovery response message including information related to the media flows except for the filtered information of the one or more media flows to the second terminal;
    receiving a media transfer request for at least one media flow, selected by the second terminal, from among the media flows except for the filtered information of the one or more media flows; and
    performing media transfer of the at least one media flow, wherein the one or more media flows of the filtered information could not be transferred by the media transfer request.

2. The method of claim 1, wherein the information related to at least one of user related information or operator policy is included in a registration request message from the first terminal.

3. The method of claim 1, wherein the information related to at least one of user related information or operator policy is included in a session initiation request message from the first terminal.

4. The method of claim 1, wherein the information related to at least one of user related information or operator policy is included in a session initiation response message from the first terminal.

5. The method of claim 1, wherein the information related to at least one of user related information or operator policy is included in a message sent from the first terminal to the SCC AS serving the first terminal.

6. The method of claim 1, wherein the information related to at least one of user related information or operator policy is included in a subscriber information server in a network.

7. The method of claim 1, wherein the information related to at least one of user related information or operator policy includes:
    information indicating that all media types in the session being performed by every terminal belonging to a specific user should be filtered;
    information indicating that a specific media type(s) in the session being performed by each of all terminals belonging to a specific user should be filtered;
    information indicating that all media types in the session being performed by a specific terminal belonging to a specific user should be filtered; or
    information indicating that only a specific media type(s) in the session being performed by a specific terminal belonging to a specific user should be filtered.

8. The method of claim 1, wherein the information related to at least one of user related information or operator policy comprises a parameter(s) indicating whether specific information included in the session discovery response message should be filtered.

9. A Service Centralization and Continuity Application Server (SCC AS) for controlling a session being performed between at least one first terminal and a remote end, the SCC AS comprising:
    a transceiver; and
    a processor configured to:
        control the transceiver;
        receive a session discovery request message for acquiring information related to the session being performed between the at least one first terminal and a remote end from a second terminal;
        filter information of one or more a media flows of the session based on information related to at least one of user related information or operator policy;
        transmit a session discovery response message including information related to the media flows except for the filtered information of the one or more media flows to the second terminal;
        receiving a media transfer request for at least one media flow, selected by the second terminal, from among the media flows except for the filtered information of the one or more media flows; and performing media transfer of the at least one media flow, wherein the one or more media flows of the filtered information could not be transferred by the media transfer request.

10. The SCC AS of claim 9, wherein the information related to at least one of user related information or operator policy is included in a registration request message from the first terminal.

11. The SCC AS of claim 9, wherein the information related to at least one of user related information or operator policy is included in a session initiation request message from the first terminal.

12. The SCC AS of claim 9, wherein the information related to at least one of user related information or operator policy is included in a session initiation response message from the first terminal.

13. The SCC AS of claim 9, wherein the information related to at least one of user related information or operator policy is included in a message sent from the first terminal to the SCC AS serving the first terminal.

14. The SCC AS of claim 9, wherein the information related to at least one of user related information or operator policy is included in a subscriber information server in a network.

15. The SCC AS of claim 9, wherein the information related to at least one of user related information or operator policy includes:

information indicating that all media types in the session being performed by every terminal belonging to a specific user should be filtered;

information indicating that a specific media type(s) within the session being performed by each of all terminals belonging to a specific user should be filtered;

information indicating that all media types in the session being performed by a specific terminal belonging to a specific user should be filtered; or information indicating that only a specific media type(s) in the session being performed by a specific terminal belonging to a specific user should be filtered.

16. The method of claim 1, further comprising, receiving media transfer request including information whether to keep the control of collaborative session.

17. The method of claim 1, further comprising:

receiving media transfer request for a media transferring, wherein the first terminal keeps control of collaborative session after the media transferring.

18. The method of claim 17, the first terminal is a controller user equipment (UE) and the second terminal is a controllee UE.

* * * * *